United States Patent
Kishi et al.

(10) Patent No.: US 11,321,764 B2
(45) Date of Patent: May 3, 2022

(54) INFORMATION PROCESSING APPARATUS AND INFORMATION PROCESSING METHOD

(71) Applicant: SONY CORPORATION, Tokyo (JP)

(72) Inventors: Haruhiko Kishi, Tokyo (JP); Yoko Fukata, Saitama (JP); Akari Hoshi, Tokyo (JP); Takahiro Sakai, Tokyo (JP)

(73) Assignee: SONY CORPORATION, Tokyo (JP)

( * ) Notice: Subject to any disclaimer, the term of this patent is extended or adjusted under 35 U.S.C. 154(b) by 329 days.

(21) Appl. No.: 16/329,552

(22) PCT Filed: Oct. 27, 2017

(86) PCT No.: PCT/JP2017/038862
§ 371 (c)(1),
(2) Date: Feb. 28, 2019

(87) PCT Pub. No.: WO2018/088243
PCT Pub. Date: May 17, 2018

(65) Prior Publication Data
US 2019/0254408 A1    Aug. 22, 2019

(30) Foreign Application Priority Data
Nov. 11, 2016    (JP) .............................. JP2016-220618

(51) Int. Cl.
*G06Q 30/06*    (2012.01)
*G06T 7/90*    (2017.01)
(Continued)

(52) U.S. Cl.
CPC ..... *G06Q 30/0633* (2013.01); *G06K 9/00281* (2013.01); *G06Q 30/0631* (2013.01);
(Continued)

(58) Field of Classification Search
None
See application file for complete search history.

(56) References Cited

U.S. PATENT DOCUMENTS

| | | | | |
|---|---|---|---|---|
| 2012/0044335 A1* | 2/2012 | Goto | ....................... | G06T 11/00 |
| | | | | 348/77 |
| 2012/0223956 A1* | 9/2012 | Saito | ....................... | G06T 19/00 |
| | | | | 345/582 |

(Continued)

FOREIGN PATENT DOCUMENTS

| CN | 105210110 A | 12/2015 |
|---|---|---|
| EP | 2953090 A1 | 12/2015 |

(Continued)

OTHER PUBLICATIONS

International Search Report and Written Opinion of PCT Application No. PCT/JP2017/038862, dated Jan. 23, 2018, 10 pages of ISRWO.

(Continued)

*Primary Examiner* — Nathan Hillery
(74) *Attorney, Agent, or Firm* — Chip Law Group

(57) ABSTRACT

Provided are an information processing apparatus and an information processing method that can propose makeup that brings parts constituting a user's face closer to an ideal arrangement. A user's face image is captured, parts of the user's face image are recognized on the basis of the face image, and a best balance face image in which the parts are optimally arranged and have optimum sizes. Makeup on the user's face image is closer to the best balance face image is set, and a recipe image displaying a process of the makeup is generated and displayed.

11 Claims, 39 Drawing Sheets

(51) Int. Cl.
*G06K 9/00* (2006.01)
*G09B 5/00* (2006.01)

(52) U.S. Cl.
CPC .................. *G06T 7/90* (2017.01); *G09B 5/00* (2013.01); *G06T 2207/10024* (2013.01); *G06T 2207/30201* (2013.01)

(56) References Cited

U.S. PATENT DOCUMENTS

| | | | | |
|---|---|---|---|---|
| 2013/0271484 | A1* | 10/2013 | Aoki | G06T 11/00 345/593 |
| 2013/0271485 | A1* | 10/2013 | Aoki | A45D 44/005 345/593 |
| 2014/0253429 | A1* | 9/2014 | Dai | G06T 7/11 345/156 |
| 2015/0050624 | A1* | 2/2015 | Yamanashi | G06Q 50/10 434/100 |
| 2015/0086945 | A1* | 3/2015 | Yamanashi | G09B 19/0076 434/100 |
| 2015/0091938 | A1* | 4/2015 | Mallick | G06K 9/38 345/595 |
| 2015/0254501 | A1* | 9/2015 | Yamanashi | G06K 9/00268 348/78 |
| 2015/0366328 | A1 | 12/2015 | Tamura et al. | |
| 2015/0379329 | A1* | 12/2015 | Sasaki | G06K 9/00281 348/77 |
| 2016/0143422 | A1* | 5/2016 | Yamanashi | A45D 44/005 345/634 |
| 2016/0148532 | A1* | 5/2016 | Yamanashi | G09B 19/00 434/100 |
| 2016/0157587 | A1* | 6/2016 | Yamanashi | A45D 44/00 434/100 |
| 2016/0260204 | A1* | 9/2016 | Yu | H04N 5/265 |
| 2016/0357578 | A1* | 12/2016 | Kim | A45D 44/005 |
| 2019/0104827 | A1* | 4/2019 | Nishi | G06T 7/00 |
| 2019/0244408 | A1* | 8/2019 | Nishi | A45D 44/005 |

FOREIGN PATENT DOCUMENTS

| | | |
|---|---|---|
| JP | 2012-181688 A | 9/2012 |
| JP | 2014-149678 A | 8/2014 |
| WO | 2008/102440 A1 | 8/2008 |

OTHER PUBLICATIONS

"Presentation of a Making-Up Method Using Animation and Proposal/Implementation of Makeup Support System Corresponding to User's Facial Expression Change", Multimedia, Distributed, Cooperative and Mobile Symposium (DICOMO2015), IPSJ Symposium Series, vol. 2015, Issue 1, ISSN-1882-0840, Jul. 2015, pp. 1450-1457.

"Presentation of a Making-Up Method Using Animation and Proposal", Information Processing Society of Japan, Multimedia, Distributed, Cooperative, and Mobile Symposium, vol. 2015, No. 1, Jul. 1, 2015, pp. 1450-1457.

"Presentation of a Making-Up Method Using Animation and Proposal/Implementation of Makeup Support System Corresponding to User's Facial Expression Change", IPSJ Symposium Series, vol. 2015, No. 1, 1450-1457 pages.

* cited by examiner

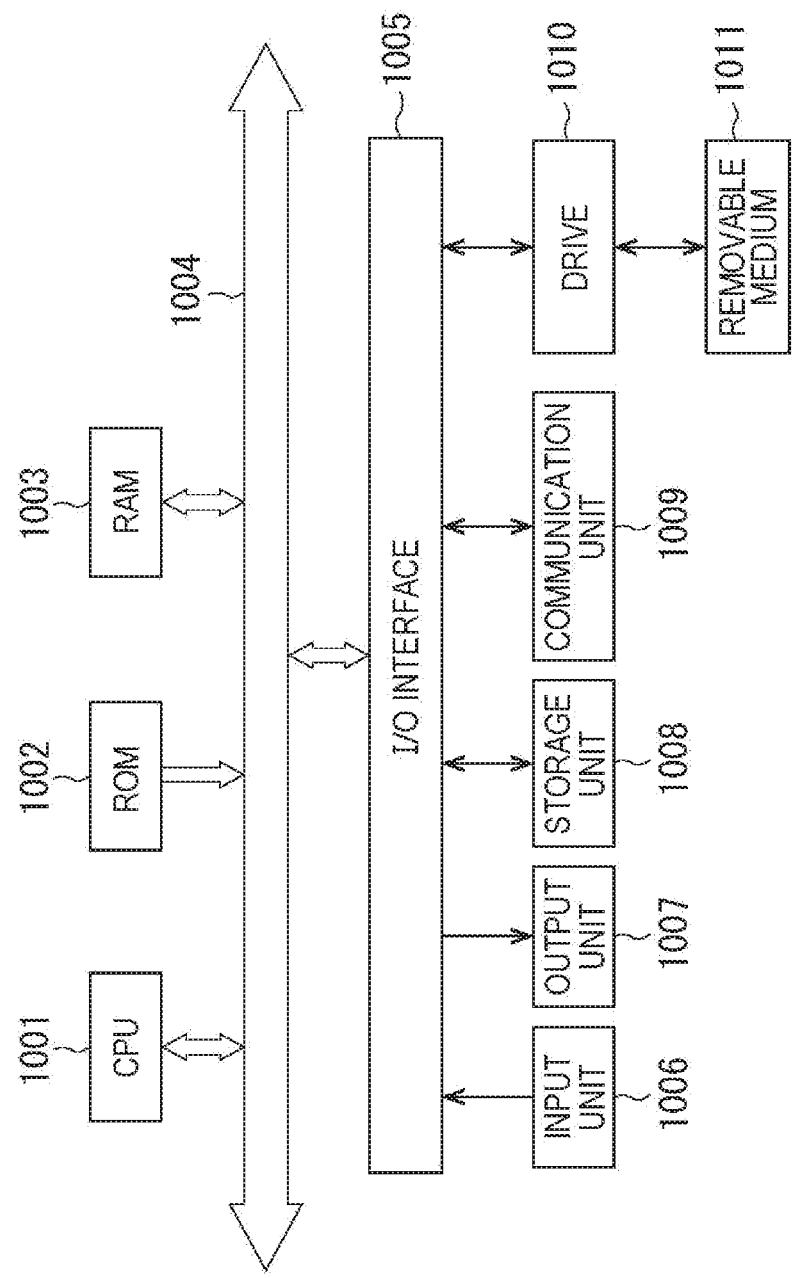

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2017/038862 filed on Oct. 27, 2017, which claims priority benefit of Japanese Patent Application No. JP 2016-220618 filed in the Japan Patent Office on Nov. 11, 2016. Each of the above-referenced applications is hereby incorporated herein by reference in its entirety.

TECHNICAL FIELD

The present disclosure relates to an information processing apparatus and an information processing method, and a program, and particularly relates to an information processing apparatus and an information processing method that are capable of assisting makeup that brings arrangement closer to arrangement of each part of an ideal face, and a program.

BACKGROUND ART

As a technique for assisting makeup, there has been proposed a technique in which makeup is assisted such that an image with makeup worn on the basis of a face image of a captured face is generated, an image with makeup is displayed in a tracking manner according to a motion of a face image to be captured, and a user does makeup while viewing the face image (see Patent Document 1).

CITATION LIST

Patent Document

Patent Document 1: Japanese Patent Application Laid-Open No. 2012-181688

SUMMARY OF THE INVENTION

Problems to be Solved by the Invention

However, the technique according to Patent Document 1 described above merely performs makeup on a captured face image and does not propose makeup that brings each part constituting the user's face closer to ideal arrangement.

The present disclosure has been made in view of such a circumstance, and particularly proposes makeup that brings each part constituting the user's face closer to ideal arrangement.

Solutions to Problems

An information processing apparatus according to an aspect of the present disclosure is an information processing apparatus including an imaging unit configured to capture a face image of a user; and a makeup setting unit configured to set makeup to be worn on a face of the user such that the face image of the user looks closer to an optimum face image in which parts constituting the face image of the user have optimum sizes and are arranged in optimum positions.

The optimum face image can be a face image in which each of the parts constituting the face image of the user has a predetermined size and is arranged in a predetermined position.

The optimum face image can be a face image in which the parts of face images of a plurality of persons have an average size and are arranged in an average position.

The optimum face image can be a face image in which the part have sizes and are arranged in positions, which are set on the basis of a predetermined theory.

The optimum face image can be a face image in which the parts have sizes and are arranged in positions, which are set on the basis of a face image of a predetermined person.

It is possible to further include: a feature amount detection unit configured to detect a feature point for recognizing the parts of the face image of the user; and an evaluation unit configured to perform evaluation by recognizing the parts and scoring a difference of each of the parts of the face image of the user with respect to the optimum face image on the basis of the feature amount, in which the makeup setting unit can set makeup to be worn on the face of the user on the basis of evaluation results of the evaluation unit such that the face image of the user looks closer to the optimum face image in which the parts constituting the face image of the user have optimum sizes and are arranged in optimum positions.

The makeup setting unit can generate a face image in which makeup is worn in a variously changing manner on the face image of the user, and the evaluation unit can set makeup in which the score of evaluation results obtained when a difference of each of the parts between the face image on which makeup is worn in a variously changing manner and the optimum face image is scored is minimum, as makeup to be worn on the face of the user.

It is possible to further include an analysis unit configured to analyze a skin color of the face image of the user, in which the makeup setting unit can set makeup to be worn on the face of the user on the basis of results of color analysis analyzed by the analysis unit and the evaluation results such that the face image of the user looks closer to the optimum face image in which the parts constituting the face image of the user have optimum sizes and are arranged in optimum positions.

It is possible to further include a recipe image generation unit configured to generate an image displaying a process of the set makeup as a recipe image of each part.

The recipe image generation unit can display the recipe image set by the makeup setting unit in sequence with respect to each of the parts.

It is possible to further include a registration unit configured to register the face image of the user and the recipe image corresponding to makeup set on the basis of the face image of the user in a database in association with information for identifying the user.

It is possible to further include a communication unit configured to transmit the face image of the user and the recipe image corresponding to makeup set on the basis of the face image of the user to an external server apparatus in association with information for identifying the user for registration as a database.

An information processing method according to an aspect of the present disclosure is an information processing method including steps of: acquiring a face image of a user; and setting makeup to be worn on a face of the user such that the face image of the user looks closer to an optimum face image in which parts constituting the face image of the user have optimum sizes and are arranged in optimum positions.

A program according to an aspect of the present disclosure is a program causing a computer to function as: an imaging unit configured to capture a face image of a user; and a makeup setting unit configured to set makeup to be worn on a face of the user such that the face image of the user looks closer to an optimum face image in which parts constituting the face image of the user have optimum sizes and are arranged in optimum positions.

According to an aspect of the present disclosure, a face image of a user is acquired; and makeup to be worn on a face of the user such that the face image of the user looks closer to an optimum face image in which parts constituting the face image of the user have optimum sizes and are arranged in optimum positions is set.

Effects of the Invention

According to an aspect of the present disclosure, in particular, it is possible to propose makeup that brings parts constituting the user's face closer to an ideal arrangement.

BRIEF DESCRIPTION OF DRAWINGS

FIG. 42 is a diagram explaining a configuration example of a general-purpose personal computer.

MODE FOR CARRYING OUT THE INVENTION

Figure 1:
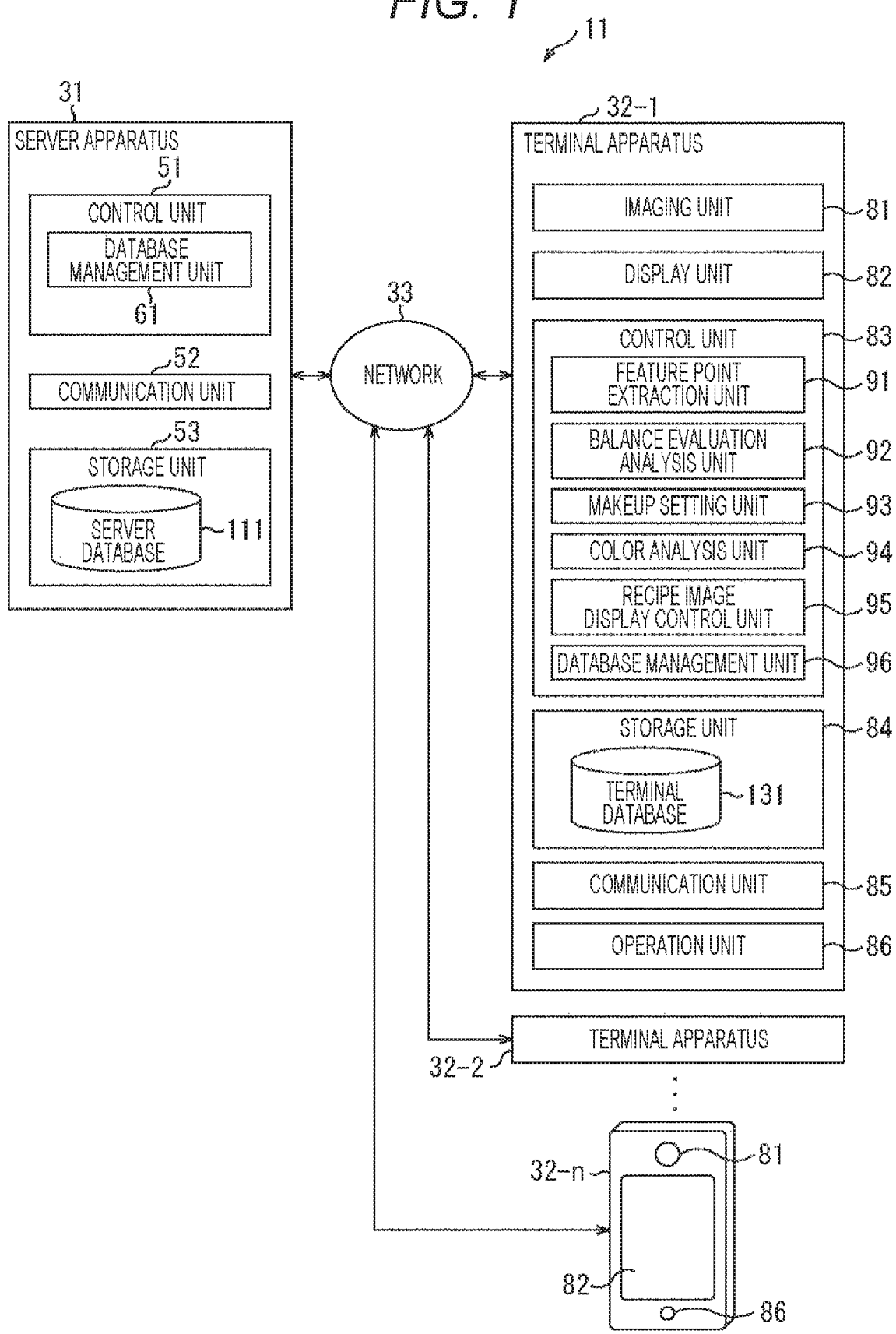
FIG. 1 is a block diagram illustrating a configuration example of an information processing system of the present disclosure.

Preferred embodiments of the present disclosure will be described in detail below with reference to the accompanying drawings. Note that constituent elements having practically the same functional configurations in the present description and drawings are designated with the same reference numerals and will not be elaborated.

<Configuration Example of the Information Processing System>

In an information processing system to which the technique of the present disclosure has been applied and which includes a server apparatus and a terminal apparatus, for example, the terminal apparatus including a tablet terminal captures a user's face image with an imaging unit including a built-in camera, recognizes each part constituting the face image on the basis of the captured face image, and determines a best balance face image in which the parts are optimally arranged from the recognized parts, the contour of the face image, or the like. Then, the terminal apparatus determines and scores a difference between the user's captured face image and the best balance face image, and sets makeup that brings the user's face image closer to the best balance face image on the basis of the score. The terminal apparatus generates and displays a recipe image that displays a process of makeup like a recipe that displays a cooking process so as to assist the user's makeup. Furthermore, the server apparatus registers information including the user's face image of the terminal apparatus and the recipe image corresponding to the set makeup as database in association with information for identifying the user.

FIG. 1 illustrates a configuration example of the information processing system to which the technique of the present disclosure has been applied and which includes the server apparatus and the terminal apparatus for assisting the user's makeup.

An information processing system 11 of FIG. 1 includes a server apparatus 31, terminal apparatuses 32-1 to 32-n, and a network 33. Note that, hereinafter, the terminal apparatuses 32-1 to 32-n are simply referred to as the terminal apparatus 32 in a case where distinction is not particularly necessary, and the other configurations are also referred to in a similar way.

The terminal apparatus 32 is, for example, a tablet terminal or the like indicated by the terminal apparatus 32-n, which is carried by a user. The terminal apparatus 32 captures the user's face image and recognizes parts of the captured face image. The terminal apparatus 32 also sets a best balance face image in which the parts of the user's captured face image are optimally arranged. Then, the terminal apparatus 32 scores a difference between the best balance face image and the user's actual face image and evaluates the user's face image. The terminal apparatus 32 sets makeup that brings the user's face image closer to the best balance face image on the basis of the evaluation results and presents a recipe image including an image displaying the process of the makeup.

Furthermore, the terminal apparatus 32 transmits the user's actual captured face image and the recipe image that assists the makeup relative to the user's face image to the server apparatus 31 via the network 33 represented by the Internet.

The server apparatus 31 stores each user's face image and the recipe image transmitted via the network 33 in the database in association with information for identifying the user.

In more detail, the server apparatus 31 includes a control unit 51, a communication unit 52, and a storage unit 53. The control unit 51 is, for example, an arithmetic processing apparatus including a central processing unit (CPU), a random access memory (RAM), and a read only memory (ROM). The CPU loads a program or data stored in the storage unit 53 including the ROM, a hard disc drive (HDD), a solid state drive (SSD), or the like to the RAM to execute predetermined processing.

Furthermore, the control unit 51 controls the communication unit 52 including an Ethernet board and the like, and receives the information of the user's face image and the recipe image transmitted from the terminal apparatus 32 via the network 33 represented by the Internet. Then, the control unit 51 causes the database management unit 61 to store the information of the user's face image and the recipe image, which has been received, in the server database 111 stored on the storage unit 53 in association with the user information for identifying the user.

The terminal apparatus 32 includes an imaging unit 81, a display unit 82, a control unit 83, a storage unit 84, a communication unit 85, and an operation unit 86.

The imaging unit 81 is an image sensor provided on an upper part of the terminal apparatus 32 including a tablet terminal as indicated by the terminal apparatus 32-n, e.g., a charge coupled device (CCD) or a complementary metal oxide semiconductor (CMOS), which captures an image in a direction opposing an imaging surface. In general, the tablet-like terminal apparatus 32 includes a camera or the like having a function of performing capturing in a direction opposing the user and in the opposite direction. However, the imaging unit 81 herein includes a camera that performs capturing in a direction opposing the user. Accordingly, when the terminal apparatus 32 is in a state of being gripped by the user, typically, the imaging unit 81 is configured to capture the user's face image.

The display unit 82 is provided on a surface of a tablet terminal as indicated by the terminal apparatus 32-n and includes a liquid crystal display (LCD) or an organic electro luminescence (EL). The display unit 82 displays processing results of the control unit 83 or an image captured by the imaging unit 81.

The control unit 83 is, for example, an arithmetic processing apparatus including a CPU, a RAM, and a ROM. The CPU loads a program or data stored on the storage unit 53 including a ROM, an HDD, an SSD, or the like into the RAM to execute predetermined processing. In more detail, the control unit 83 executes a program or data so as to function as a feature point extraction unit 91, a balance evaluation analysis unit 92, a makeup setting unit 93, a color analysis unit 94, a recipe image display control unit 95, and a database management unit 96.

The feature point extraction unit 91 extracts a feature point for extracting parts constituting a user's face including the face contour, eyes, a nose, lips, eyebrows, and the like from the face image captured by the imaging unit 81.

The balance evaluation analysis unit 92 recognizes the user's face contour or various parts on the basis of the feature point information and determines the best balance face image in which each part corresponding to the recognized contour is optimally arranged or has an optimum size. The balance evaluation analysis unit 92 scores a difference between the various parts of the user's actual captured face image and the various parts of the best balance face image to carry out balance evaluation analysis.

The color analysis unit 94 analyzes skin color from the user's actual face image captured by the imaging unit 81.

The makeup setting unit 93 sets makeup that makes the user's face image look closer to the best balance face image on the basis of the color analysis results and the balance evaluation analysis results in which a difference between the arrangement or size of various parts of the user's actual face image captured by the imaging unit 81 and the arrangement or size of various parts of the best balance face image is scored.

The recipe image display control unit 95 generates a recipe image displaying a process of makeup of each part for performing makeup set by the makeup setting unit 93 and sequentially displays the generated recipe images with respect to each of the various parts to assist the user's makeup.

The database management unit 96 registers and manages the recipe image generated by the recipe image display control unit 95 and the user's captured face image in the terminal database 131 in the storage unit 84 including the HDD, the SSD, or the like in association with the information for identifying the user. Furthermore, the database management unit 96 transmits the recipe image generated by the recipe image display control unit 95 and the user's captured face image to the server apparatus 31 via the network 33 together with the information for identifying the user by controlling the communication unit 85 including the Ethernet board and the like.

In a case where the display unit 82 includes a touch panel or the like, the operation unit 86 includes an operation button displayed on the display unit 82, an operation button provided, for example, under the display unit 82 of the terminal apparatus 32-*n*, or the like. The operation unit 86 receives the user's operation and generates an operation signal corresponding to the operation content.

<Configuration Example of the Terminal Database>

Figure 2:
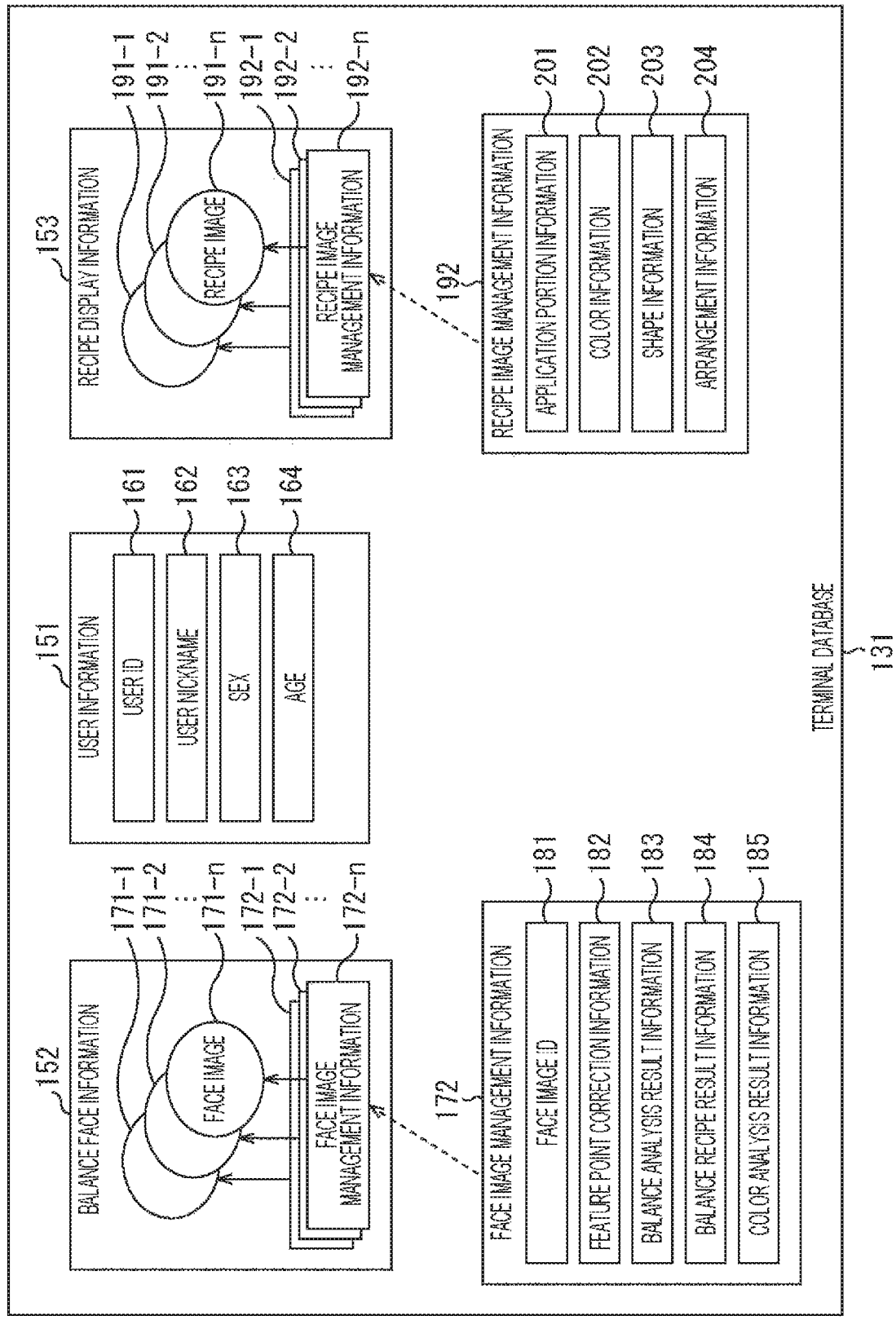
FIG. 2 is a diagram illustrating a configuration example of a terminal database.

Next, a configuration example of the terminal database 131 is described with reference to FIG. 2.

The terminal database 131 includes user information 151, balance face information 152, and recipe display information 153.

The user information 151 is information that is inherent to a user and identifies the user. The user information 151 includes information of user identification (ID) 161, a user's nickname (user's name and nickname) 162, a user's sex 163, and a user's age 164.

The balance face information 152 includes the user's face images 171-1 to 171-*n* captured by the imaging unit 81, which are registered in association with face image management information 172-1 to 172-*n*, respectively.

The face image management information 172 includes a face image identifier (ID) 181, feature point correction information 182, balance analysis result information 183, balance recipe result information 184, and color analysis result information 185.

The face image ID is information for identifying the user's face image captured by the imaging unit 81.

The feature point correction information 182 is information of a feature point for recognizing parts constituting the face image described later including eyes, a nose, lips, eyebrows, and the like, and moreover is information including information of a feature point corrected by the user. In other words, the information of the feature point extracted from the face image can be detected out of the position that is required in practice (erroneously detected). Therefore, the information can be corrected by the user. The feature point correction information 182 is information of all feature points including a feature point corrected by the user.

The balance analysis result information 183 is information displaying balance evaluation analysis results in which a difference between the best balance face image and the user's actual captured face image is scored by the balance evaluation analysis unit 92.

The balance recipe result information 184 is information displaying balance evaluation analysis results in which a difference between the best balance face image and a face image obtained when the makeup set to bring the face image closer to the best balance face image by simulation is worn is scored.

The color analysis result information 185 is analysis results based on the user's face image and is information displaying to which skin color preset in a palette form the user's face color correspond.

The recipe display information 153 includes recipe images 191-1 to 191-*n* of the face images 171-1 to 171-*n* and corresponding recipe image management information 192-1 to 192-*n*.

The recipe image management information 192 includes application portion information 201, which is information related to a portion corresponding to a part to which application is made among the parts constituting the face, color information 202, which is information related to the color of makeup to be performed on each part, shape information 203, which is information of the shape of each part, and arrangement information 204, which is information related to arrangement of each part.

<Configuration Example of the Server Database>

Figure 3:
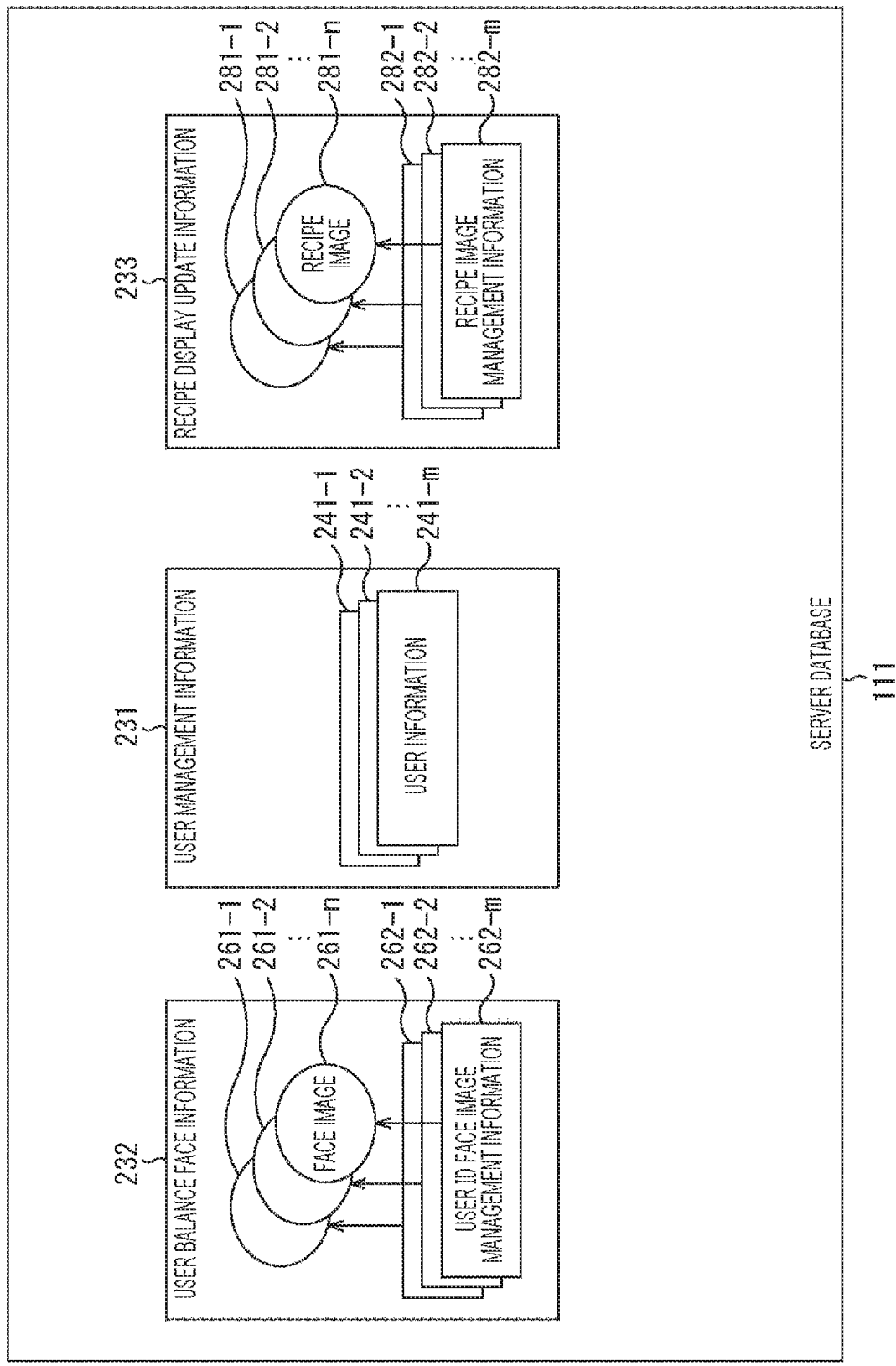
FIG. 3 is a diagram illustrating a configuration example of a server database.

Next, a configuration example of the server database 111 is described with reference to FIG. 3.

The server database 111 includes user management information 231, user balance face information 232, and recipe display update information 233.

The user management information 231 is information, which is transmitted from each terminal apparatus 32 via the network 33, for managing the user information 151 of each terminal apparatus 32. The user management information 231 stores information corresponding to the user information 151 as user information 241-1 to 241-*m*.

The user balance face information 232 stores face image 171 of balance face information 152, face images 261-1 to 261-*m* corresponding to face image management information 172, and face image management information 262-1 to 262-*m*. Here, the face image management information 262-1 to 262-*m* each includes a user ID 161 of user information 241 corresponding to the user information 151.

The recipe display update image 233 stores a recipe image 191 of the recipe display information 153 of the terminal database 131, recipe images 281-1 to 281-*m* corresponding to recipe image management information 192, and recipe image management information 282-1 to 282-*m* in association with one another.

<Concept of the Best Balance Face Image>

Next, a concept of the best balance face image in which each of various parts is optimally arranged in accordance with the user's face contour or the like in the balance evaluation analysis unit 92.

In general, it is said that the best balance face image can be expressed in such a manner that each part of the eyes, the nose, the lips, the eyebrows, or the like of faces of a great number of people has an average size and is arranged in an average position. Thus, the best balance face image may be a face image configured such that each part of the eyes, the nose, the lips, the eyebrows, or the like of faces of many people has an average size and is arranged in an average position. Note that, in the following, a face image in which each part of the eyes, the nose, the lips, the eyebrows, or the like of faces of a great number of people has an average size and is arranged in an average position is also referred to as an average face image.

Furthermore, the best balance face image may be a face image including arrangement of each part other than the average face image. The best balance face image may, for example, be a face image based on a predetermined theory that defines an optimum arrangement by a makeup-related expert or the like, e.g., a prominent makeup artist.

More specifically, the balance of size and arrangement of each part of the best balance face image may satisfy at least one or more of the following conditions as illustrated by FIGS. 4 to 11: the condition of vertical length of face, the condition of lateral width of face, the condition of length from under nose to chin, the condition of size of eye, the condition of position of eye, the condition of size of nose, the condition of position of nose, the condition of height of ear, the condition of size of lip, the condition of position of lip, the condition of side face, the condition of balance of eye, the condition of balance of mouth, the condition of balance of eyebrow, and the condition of balance of cheek.

Figure 4:
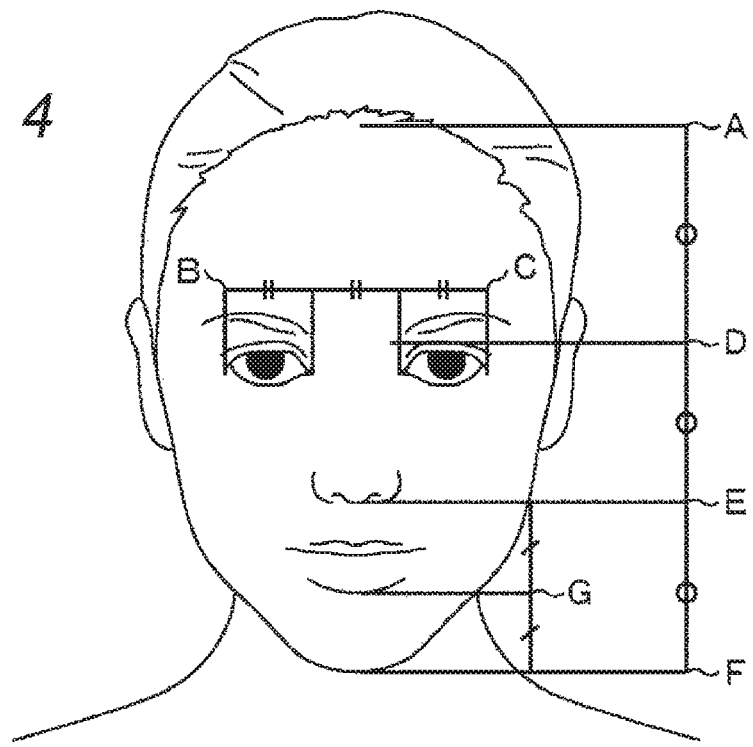
FIG. 4 is a diagram explaining a concept of a best balance face image.

In other words, under the condition of the vertical length of the face, for example, as illustrated in FIG. 4, a length AD from the hairline to under the inside end of the eyebrow, a length DE from the inside end of the eyebrow to under the nose, and a length EF from under the nose to the bottom of the chin are substantially the same length.

Furthermore, under the condition of the lateral width of the face, for example, as illustrated in FIG. 4, within a length BC between the outer corners of the right and left eyes, the width of the left eye, the width of the right eye, and the width between the right and left eyebrows are substantially the same, and each width is roughly five times the width of the pupil.

Moreover, under the condition of the length from under the nose to the chin, for example, as illustrated in FIG. 4, a length EG from under the nose to under the lower lip and a length GF from under the lower lip to the chin are substantially the same.

Figure 5:
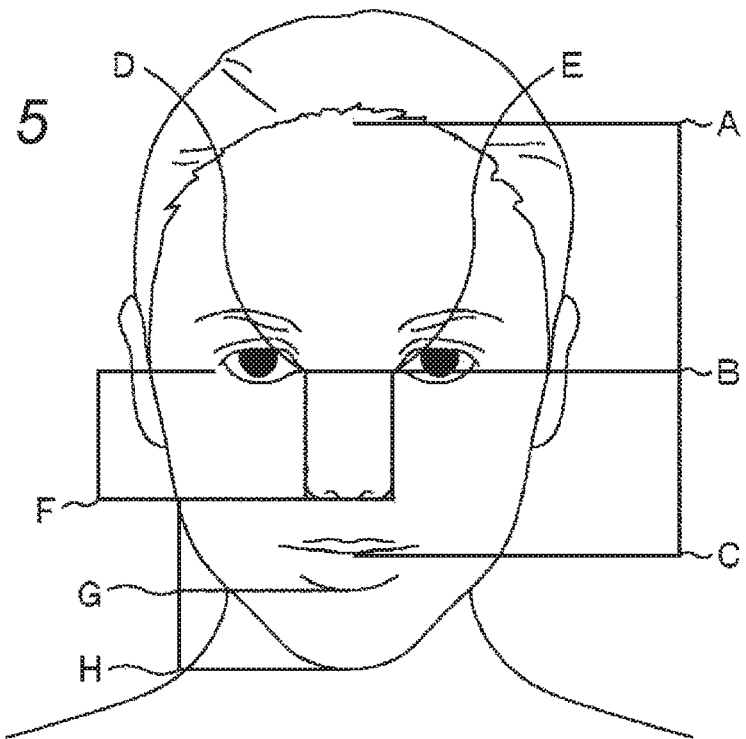
FIG. 5 is a diagram explaining a concept of a best balance face image.

Under the condition of the size of the eye, for example, as illustrated in FIG. 5, a ratio of the vertical length to the lateral length of the eye is substantially 1:3.

Under the condition of the position of the eye, for example, as illustrated in FIG. 5, a length AB from the hairline to the eye and a length BC from the eye to the middle position of the lip are substantially the same length, and the width of the left eye, the width of the right eye, and the width between the right and left eyebrows are substantially the same.

Under the condition of the size of the nose, for example, as illustrated in FIG. 5, the nasal wing (lateral width of the nose) DE is substantially the same as the length of the lateral width of the eye.

Under the condition of the position of the nose, for example, as illustrated in FIG. 5, a length FG from under the nose to under the lower lip and a length GH from under the lower lip to the chin are substantially the same.

The condition of the height of the ear is, for example, as illustrated in FIG. 5, a height between an extension B from the outer corner of the eye and an extension F from under the nose.

Figure 6:
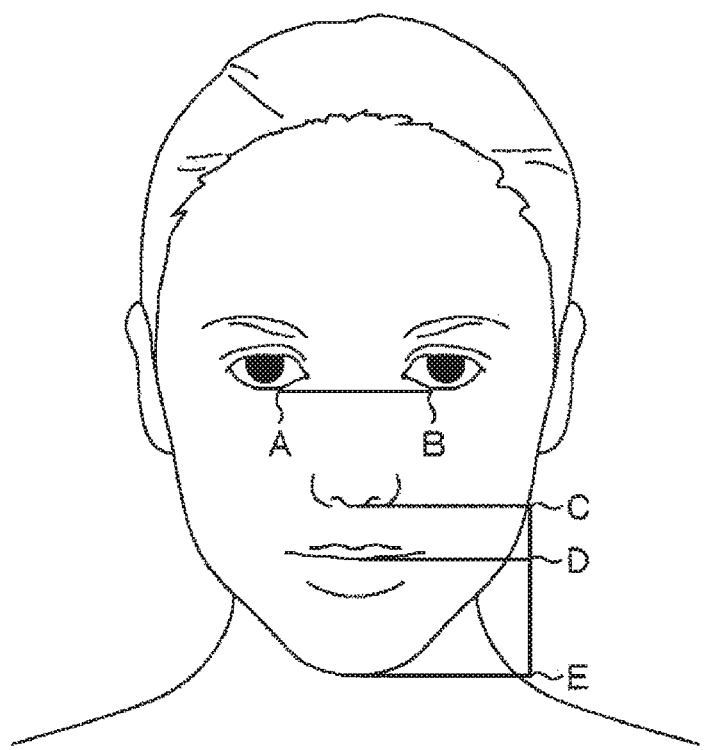
FIG. 6 is a diagram explaining a concept of a best balance face image.

Under the condition of the size of the lip, for example, as illustrated in FIG. 6, the lateral width of the lip is substantially the same as a distance AB between right and left pupils, and a ratio of the vertical width of the upper lip to the vertical width of the lower lip is substantially 1:1.3 to 1:1.5.

Under the condition of the position of the lip, for example, as illustrated in FIG. 6, when a length CE from under the nose to the bottom of the chin is divided into three equal parts, a middle D of the lip lies in the position of ⅓ from the top.

Figure 7:
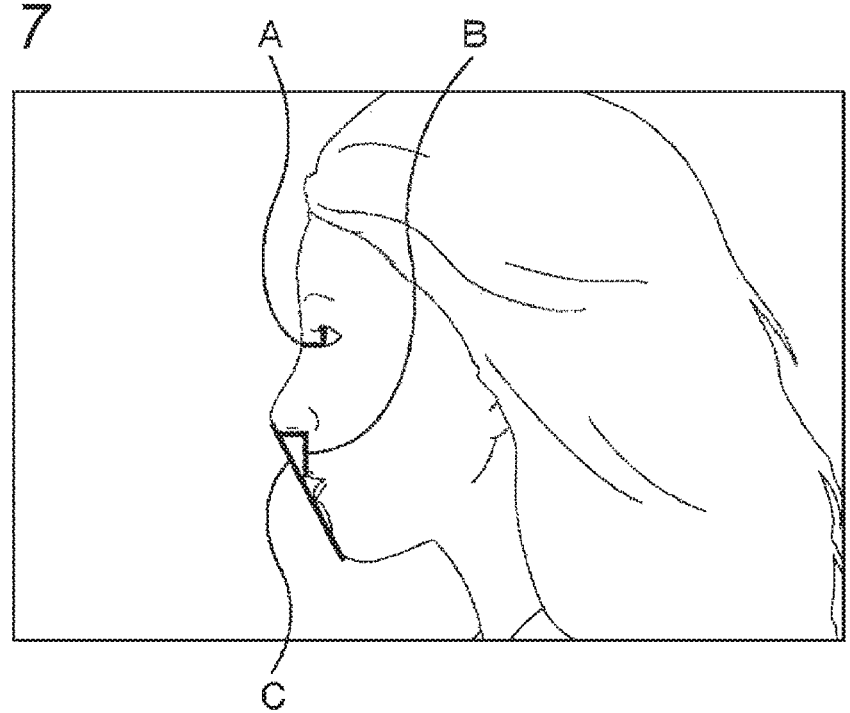
FIG. 7 is a diagram explaining a concept of a best balance face image.

Under the condition of the side face, as illustrated in FIG. 7, an angle B between the nose and under the nose is 90 degrees, the front end of the upper lip contacts a straight line C connecting the bottom of the chin to the tip of the nose or is slightly inside the straight line C (on the face side), and a space between the inner corner of the eye and an upper end A of the nose is about 5 mm.

Figure 8:
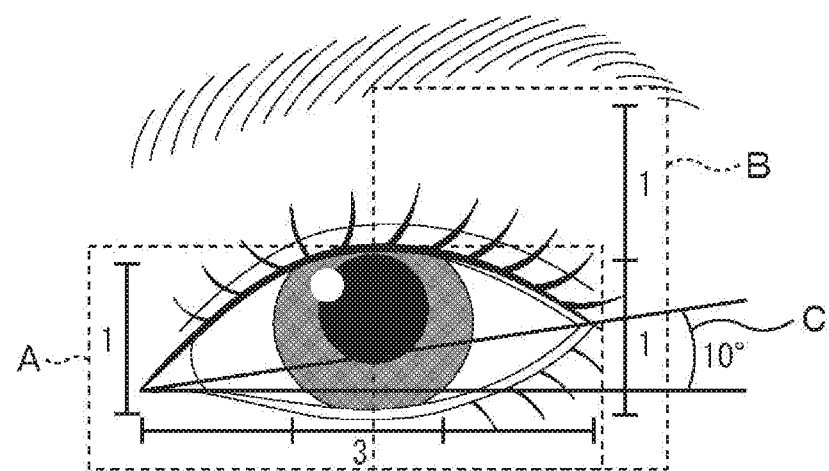
FIG. 8 is a diagram explaining a concept of a best balance face image.

Under the condition of the balance of the eye, for example, as illustrated in range A of FIG. 8, a ratio of the vertical width to the lateral width of the eye is substantially 1:3, as illustrated in range B, a ratio of the vertical width of the eye and the width of the eyelid is substantially 1:1, and as indicated by angle C, an angle between the inner corner of the eye and the outer corner of the eye is substantially 10 degrees.

Figure 9:
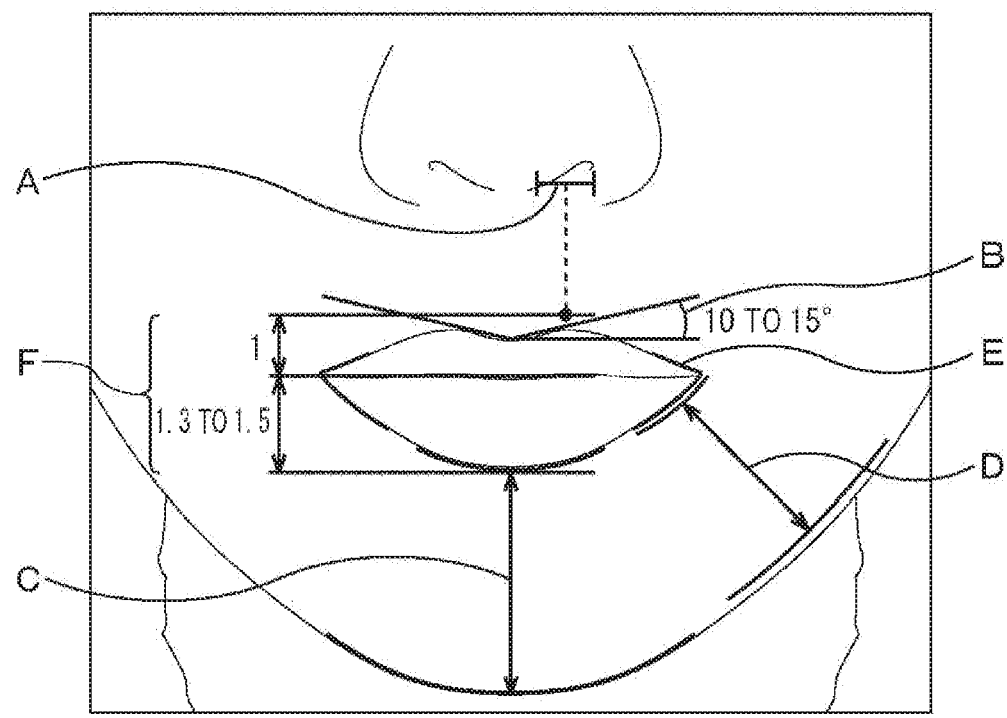
FIG. 9 is a diagram explaining a concept of a best balance face image.

Under the condition of the balance of the mouth, for example, as indicated by the dotted line extending from the range A of FIG. 9, the peak of the upper lip is the same as the central position of the lateral width of the nostril and an angle B from the valley to the peak of the upper lip is substantially 10 degrees to 15 degrees, and as indicated by range C of FIG. 9, the bottom side of the lower lip lies in substantially the same position as the bottom of the chin and is longer than the width between the peaks of the upper lip. Moreover, as indicated by range D of FIG. 9, the shape of the lower lip is roughly parallel to the line of the chin. As indicated by range E of FIG. 9, the upper and lower lines of the corner of the mouth are identical when viewed from the side. As indicated by range F of FIG. 9, the balance of the upper lip and the lower lip is a ratio of substantially 1:1.3 to 1:1.5.

Figure 10:
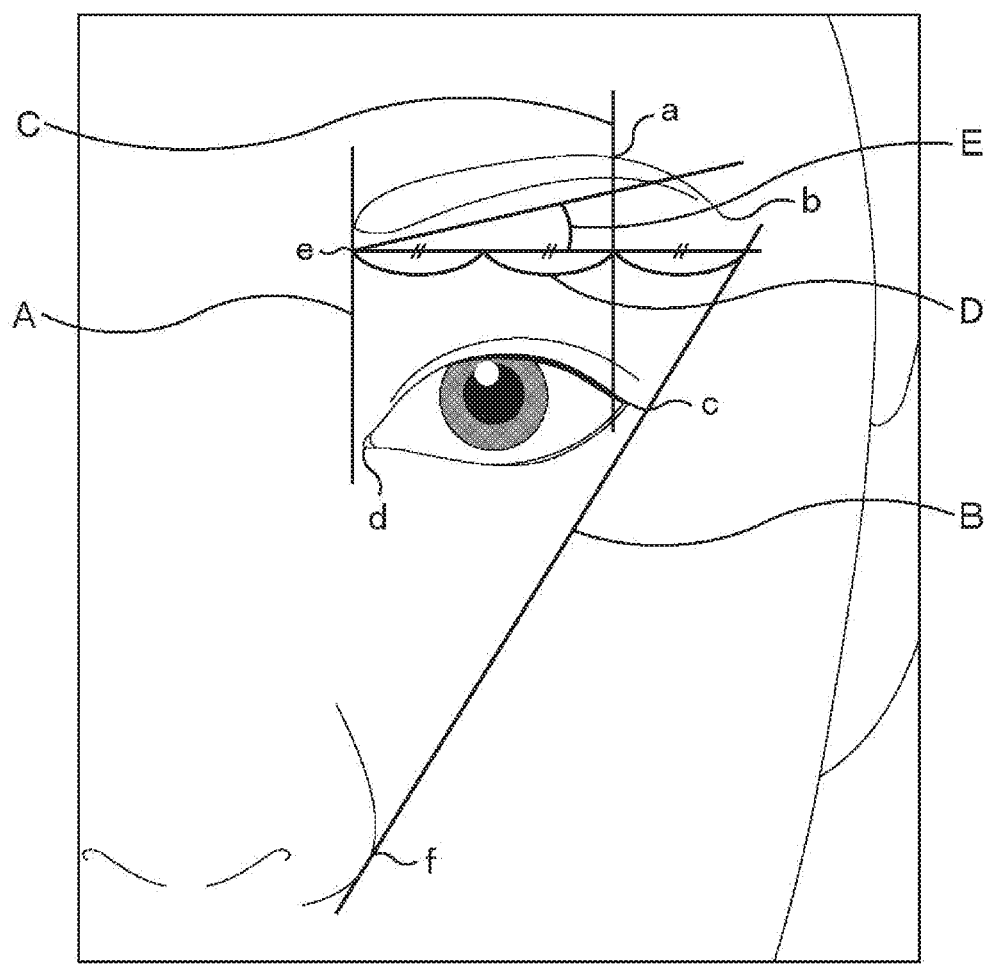
FIG. 10 is a diagram explaining a concept of a best balance face image.

Under the condition of the balance of the eyebrow, for example, as indicated by straight line A of FIG. 10, the position of an inside end of the eyebrow a starts from immediately above an inner corner of the eye d, as indicated by straight line B of FIG. 10, the position of an outer corner of the eye c is on an extension (straight line B) connecting a nose wing f to the outer corner of the eye c. As indicated by straight line C connecting the middle of the eyebrow a to outside end of the eyebrow c of FIG. 10, the position of the middle of the eyebrow a is substantially ⅔ from the inside end of the eyebrow e and is an end of the white. As indicated by straight line D of FIG. 10, the inner corner of the eye d and the outer corner of the eye c are in a straight line. As indicated by an angle E of FIG. 10, an angle with respect to the horizontal direction of the eyebrow is substantially 10 degrees.

Figure 11:
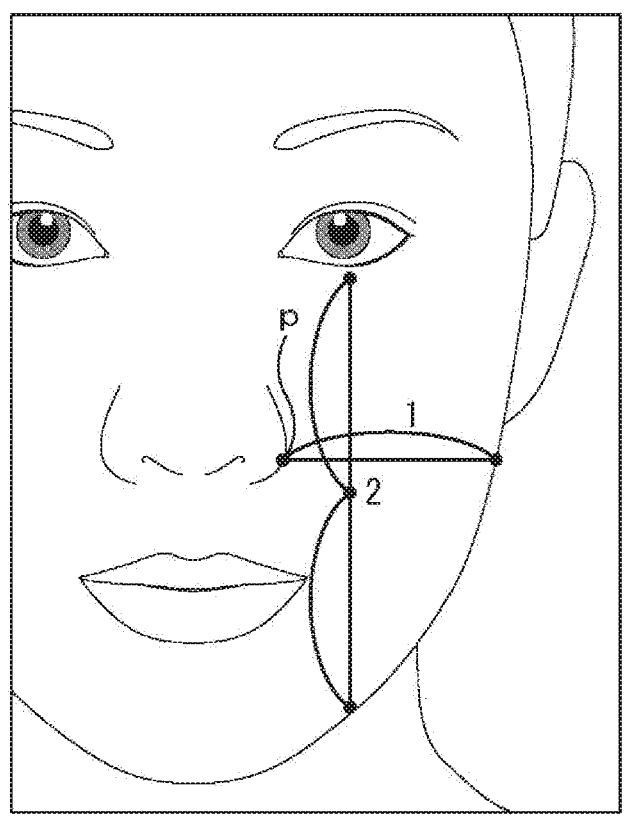
FIG. 11 is a diagram explaining a concept of a best balance face image.

Under the condition of the balance of the cheek, as indicated by range A of FIG. 11, regarding the length of the cheek, a ratio of the lateral width from the side of the nose wing p to the contour line to the vertical width from immediately under the pupil to the contour is substantially 1:2.

Note that the best balance face image may be set by other various definitions. For example, the best balance face image may be defined on the basis of the size or arrangement of parts of a predetermined face image, e.g., of a prominent figure who is generally perceived to have a beautiful face, e.g., a prominent actor or singer the user likes.

The balance evaluation analysis unit 92, on the basis of the aforementioned conditions, sets a corresponding best balance face image on the basis of the contour recognized on the basis of the information of a feature point of the user's captured face image, and scores a difference between the best balance face image and the user's face image to generate balance evaluation results.

<Concept of Method of Setting Makeup with Respect to Balance Evaluation Results>

Figure 12:
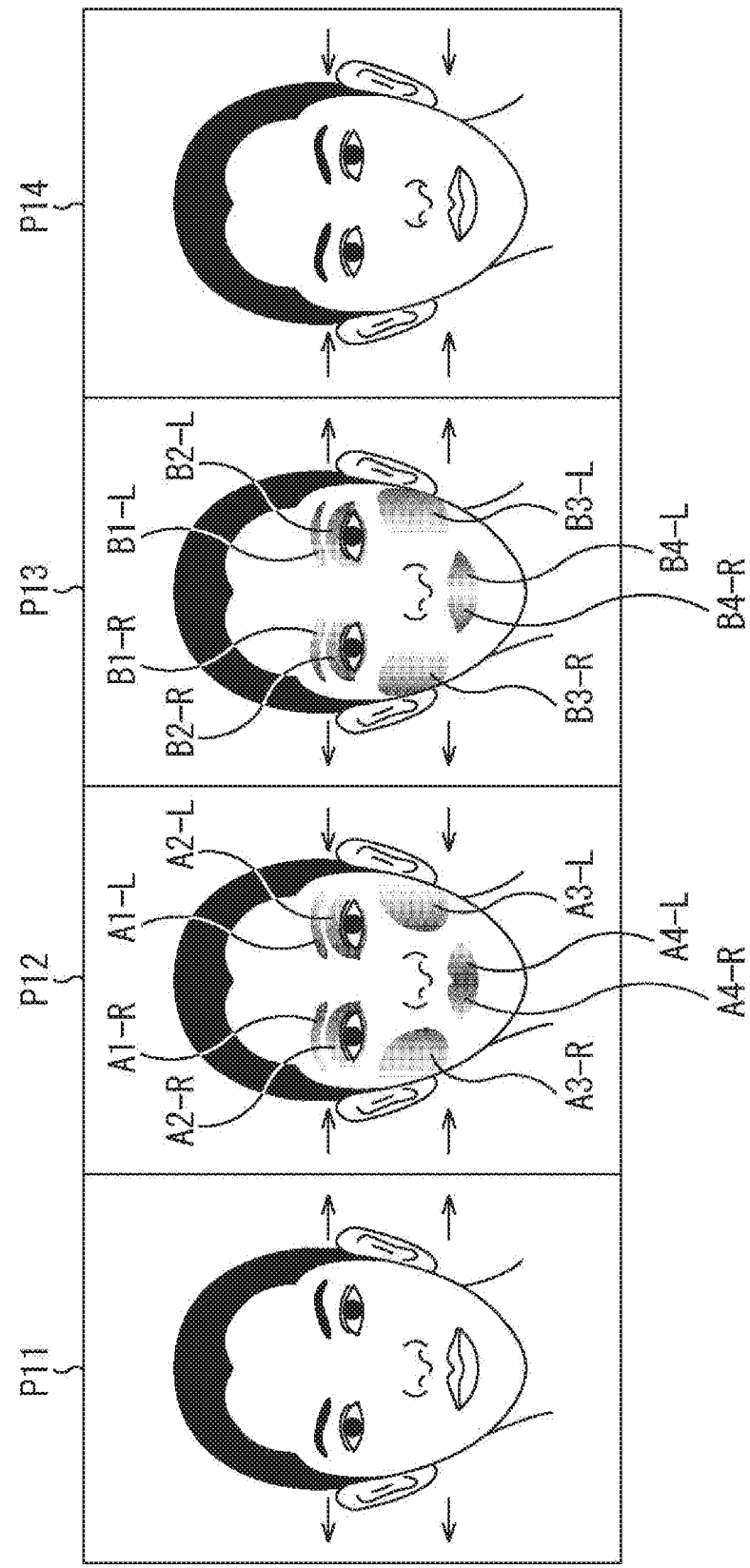
FIG. 12 is a diagram explaining a concept of makeup that brings a user's face image closer to a best balance face image.

Next, with reference to FIG. 12, a concept of a method of setting makeup with respect to the balance evaluation result is described.

The makeup setting unit 93 sets makeup that brings the user's face image closer to the best balance face image on the basis of the balance evaluation result. Then, the recipe image display control unit 95 generates a recipe image for realizing the set makeup. Here, the makeup with respect to the balance evaluation result is set to be makeup that gives an impression that brings the user's face image closer to the best balance face image based on the balance evaluation result. In other words, the user's face becomes a face that gives an impression that resembles the best balance face image in appearance when the set makeup is worn.

In other words, the makeup setting unit 93 sets makeup that adds light and shade to bring the user's face image closer to the best balance face image on the basis of the balance evaluation result.

Specifically, as indicated by the arrows in image P11 of FIG. 12, in a case where parts present to be symmetrical are distantly arranged on the right and left outer sides from the central position in the user's face image, the makeup illustrated in image P12 is set. Note that subsequently, the face image in which, among the parts that constitute the face image in such a manner, parts present right and left are distantly arranged from the central position between the right and the left is also referred to as an centrifugal face image.

In other words, for makeup with respect to eyebrows A1-R and A1-L, eyes A2-R and A2-L, cheeks A3-R and A3-L, and lips A4-R and A4-L, which are respectively present right and left, the makeup setting unit 93, in the image P12, sets makeup that adds a deeper color in a position closer to the central position between the right and left and adds a lighter color in a position farther from the central position between the right and left.

With such makeup setting, it is possible to give an impression that the various parts of the centrifugal face image indicated in the image P11 are slid to the central position between the right and left of the face image as indicated by the arrows of image P12. As a whole, the various parts are arranged at average positions and can be closer to the best balance face image.

In contrast, as indicated by the arrows in image P14 of FIG. 12, in a case where various parts present right and left of the user's face image are closer to the central position between the right and left, the makeup illustrated in image P13 is set. Note that the face image in which the various parts constituting the face image in such a manner are arranged closer to the central position between the right and the left is also referred to as the centripetal face image.

In other words, for makeup with respect to eyebrows B1-R and B2-L, eyes B2-R and B2-L, cheeks B3-R and B3-L, and lips B4-R and B4-L, which are respectively present right and left, the makeup setting unit 93, in the image P13, sets makeup that adds a deeper color in a position farther from the central position between the right and left and adds a lighter color in a position closer to the central position between the right and left.

With such makeup setting, it is possible to give an impression that the various parts of the centripetal face image indicated in the image P14 are slid away from the central position between the right and left of the face image as indicated by the arrows of image P13. As a whole, the various parts are arranged at average positions and can be closer to the best balance face image.

Thus, the makeup setting unit 93, on the basis of the balance evaluation analysis result, sets makeup in which a deeper color is put in a range closer to the center of the various parts and sets makeup in which a lighter color is put in a range away from the center of the various parts for the centrifugal face image and sets makeup in which a range closer to the center of the parts is lighter and a range farther from the center is deeper for the centripetal face image from the score indicating a difference of the best balance face image from the user's face image.

As a result, it is possible to set makeup that brings the user's face image closer to the best balance face image.

Note that, in FIG. 12, the concept of setting makeup with respect to the balance evaluation analysis result scored depending on the difference in distance from the central position of the parts in the horizontal direction (right and left direction) has been described. However, it is possible to set makeup that gives an impression that brings the user's face image closer to the best balance face image with a similar method by setting makeup that uses a similar concept with respect to a difference in another direction.

<Makeup Recipe Generation Processing>

Figure 13:
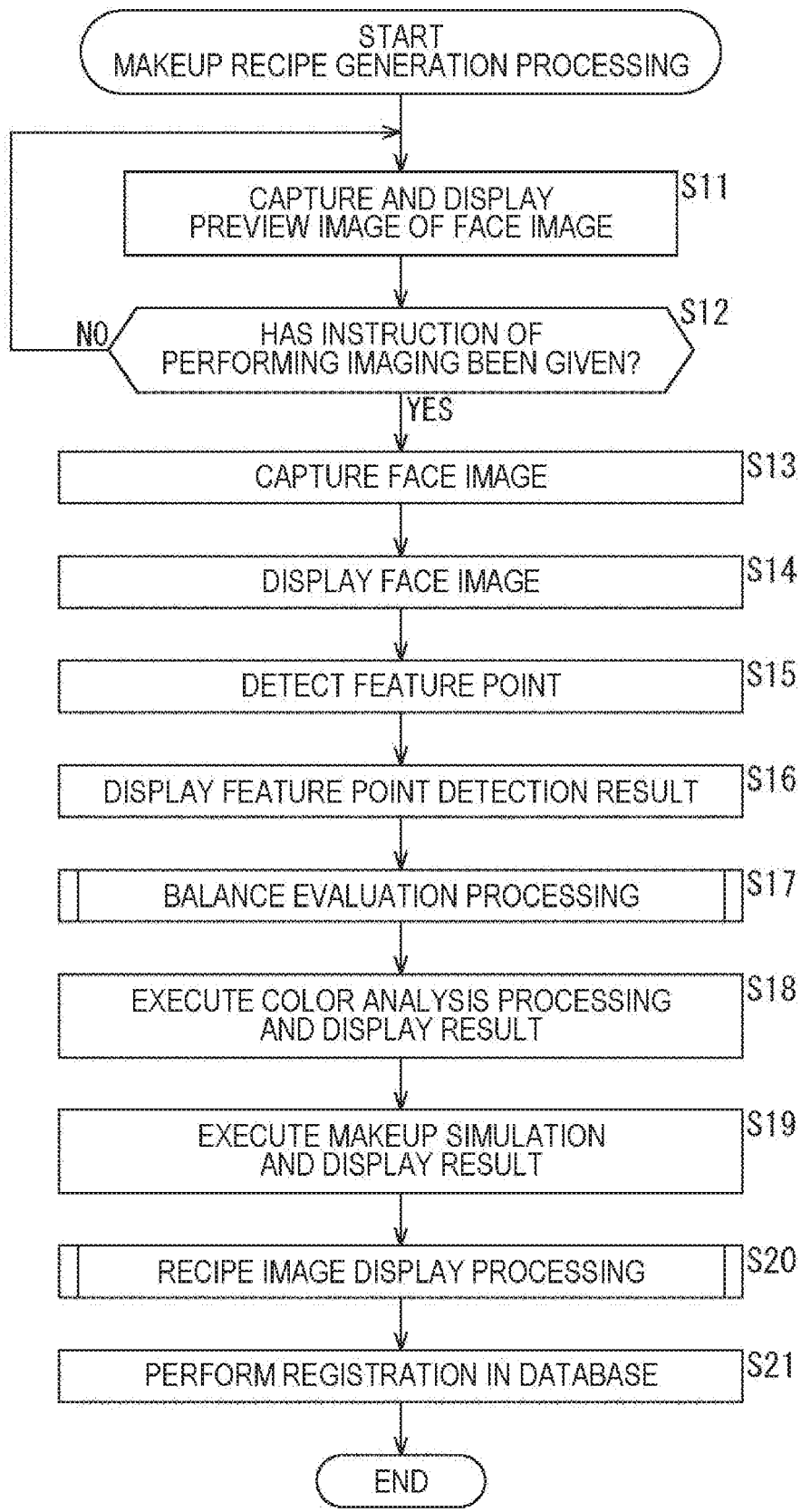
FIG. 13 is a flowchart explaining makeup recipe generation processing.

Next, with reference to a flowchart of FIG. 13, description of the makeup recipe generation processing by the information processing system of FIG. 1 is given.

In step S11, the control unit 83 causes the imaging unit 81 to capture a preview image of the face image and causes the display unit 82 to display the face image captured by the imaging unit 83 as a preview image.

In step S12, the control unit 83 controls the operation unit 86 and determines whether or not an instruction of imaging has been given by the operation of the user. In a case where an instruction of imaging has not been given, the processing returns to step S11. In other words, until an instruction of imaging is given, the control unit 83 continues to cause the display unit 82 to display the preview image of the face image. During this time, while watching the displayed preview image of the face image, the user adjusts the direction of the imaging unit 81 of the tablet-like terminal apparatus 32 into a state where an appropriate face image can be captured.

In step S12, for example, in a case where the user adjusts the direction of the imaging unit 81 of the terminal apparatus 32 and an instruction of imaging is given by the operation of the operation unit 86, the processing proceeds to step S13.

In step S13, the control unit 83 controls the imaging unit 81 to capture the face image and registers the face image in the terminal database 131 of the storage unit 84 as a face image 171 of new balance face information 152. At this time, face image management information 172 corresponding to the new face image 171 is also provided to the balance face information 152 and a face image ID 181 is registered.

Figure 14:
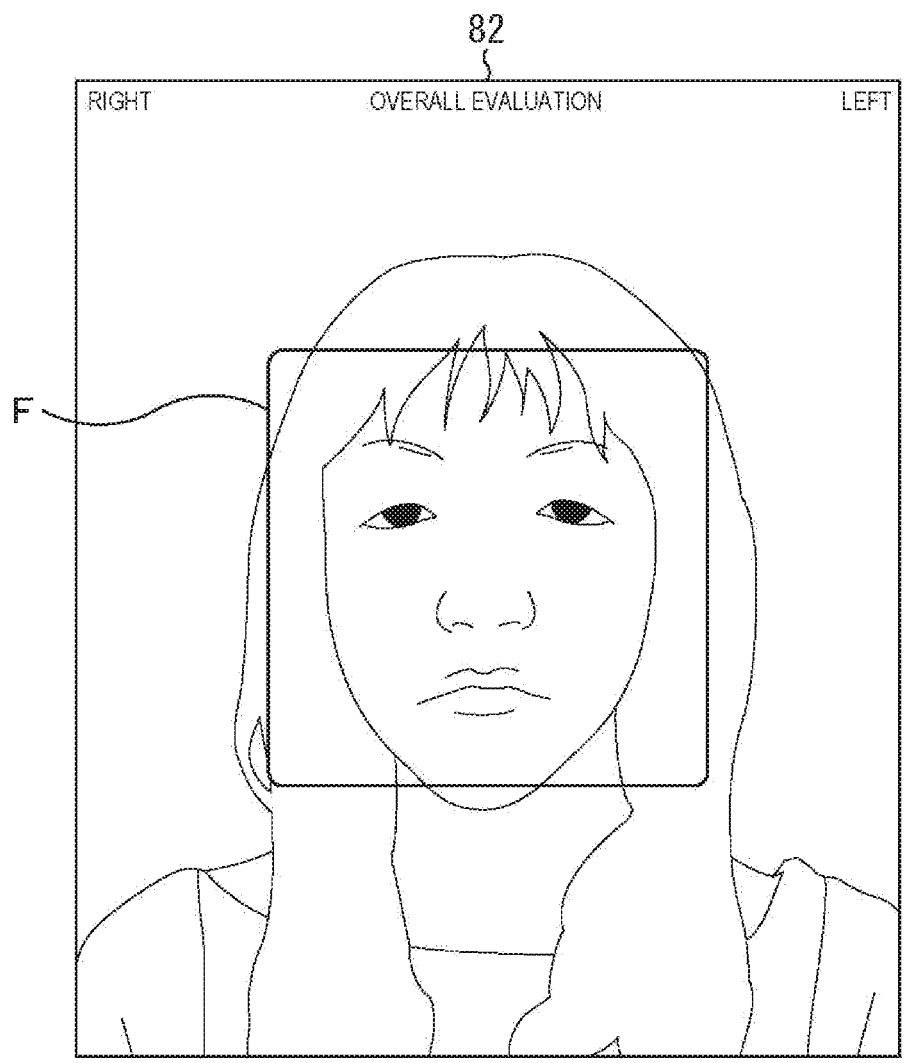
FIG. 14 is a diagram explaining a display example of makeup recipe generation processing.

In step S14, the control unit 83 causes the display unit 82 to display the captured face image as indicated, for example, in a face image F of FIG. 14. With such display, the user can check the captured face image. At this time, in a case where the user does not like the face image, re-capturing may be made.

In step S15, the control unit 83 causes the feature point extraction unit 91 to detect a feature point for extracting parts from the captured face image including the eyes, the nose, the lips, the eyebrows, and the like that constitute the face.

Figure 15:
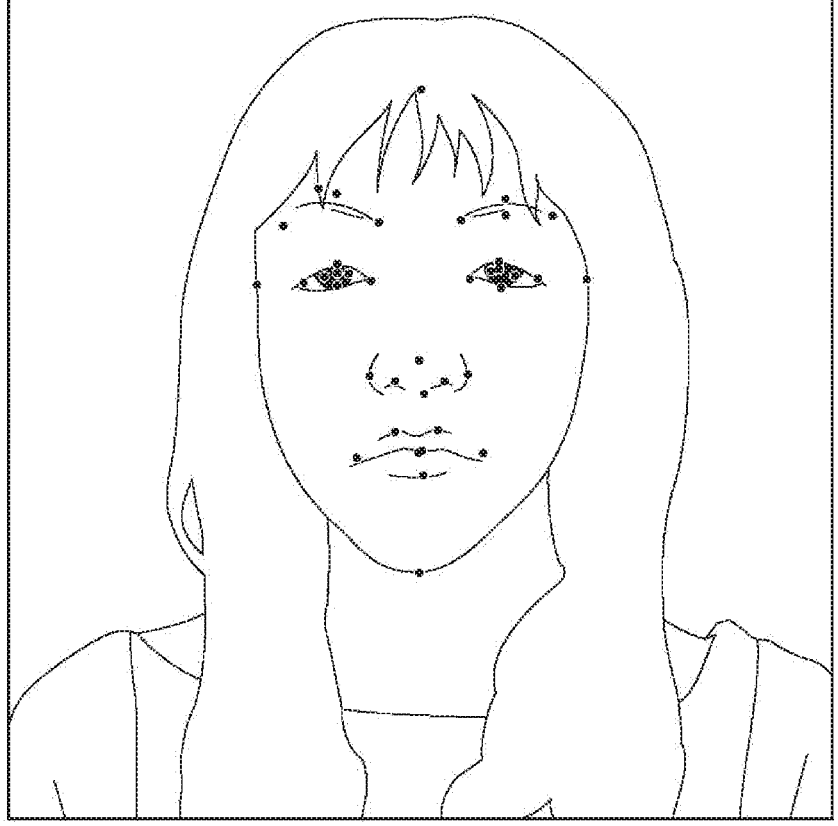
FIG. 15 is a diagram explaining a display example of makeup recipe generation processing.

In step S16, the feature point extraction unit 91, for example, as illustrated in FIG. 15, superimposes the information of the position, which has been detected as a feature point, on the captured face image and causes the display unit 82 to display them as a face part recognition result. In FIG. 15, the captured face image is displayed on the display unit 82 in a state where feature point information as black color points is superimposed. The feature point extraction unit 91 may display the feature point of black color points illustrated in FIG. 15, for example, in different colors with respect to each part including the eyes, the nose, the lips, the eyebrows, and the like constituting the face.

Furthermore, the feature point is set on the parts including the eyes, the nose, the lips, the eyebrows, and the like constituting the face. However, during the detection, in some parts, those protruding from the range of parts can be detected (some feature points are detected in error). Therefore, the protruding feature point can be corrected by the user. The feature point extraction unit 91 receives correction operation using the operation unit 86 by the user and corrects the feature point. For example, the user may make correction by tapping and shifting the feature point on the display unit 82 including a touch panel or the like of the tablet-like terminal apparatus 32, for example. At this time, the feature point extraction unit 91 registers information of all the feature points including information of the corrected feature point, as feature point correction information 182. Therefore, the feature point correction information 182 registers information of the feature point regardless of the presence or absence of correction.

In step S17, the control unit 83 causes the balance evaluation analysis unit 92 to execute balance evaluation processing and makes registration as balance analysis result information 183.

<Balance Evaluation Processing>

Figure 16:
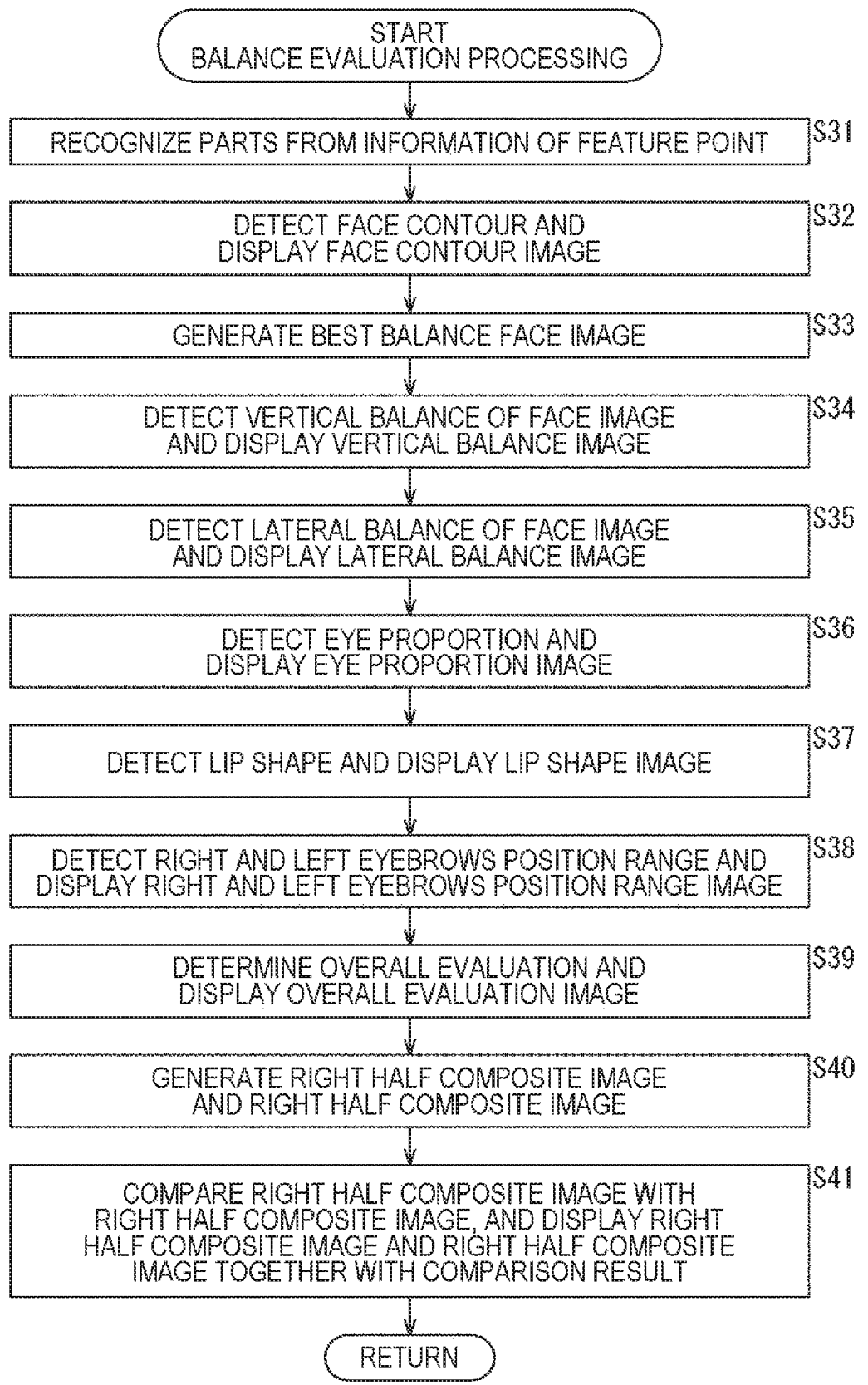
FIG. 16 is a flowchart explaining balance evaluation processing.

Here, with reference to a flowchart of FIG. 16, description of the balance evaluation processing is given.

In step S31, the balance evaluation analysis unit 92 recognizes the contour or parts including the eyes, the nose, the lips, the eyebrows, and the like on the basis of information of each feature point of the feature point correction information 182.

Figure 17:
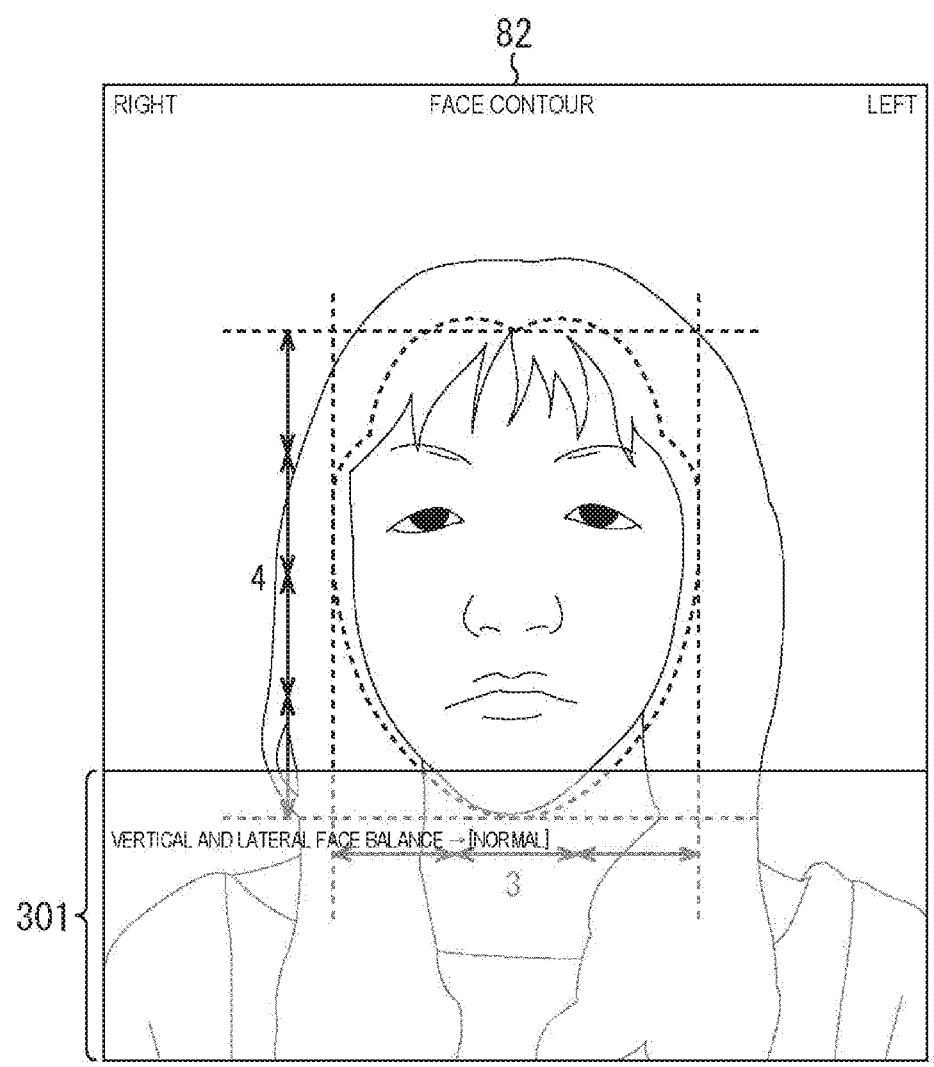
FIG. 17 is a diagram explaining a display example of balance evaluation processing.

In step S32, the balance evaluation analysis unit 92 detects the face contour constituting the face image on the basis of the feature point correction information 182 and causes the display unit 82 to display the contour image as illustrated, for example, in FIG. 17.

In the contour image of FIG. 17, the dotted line indicating the face contour is indicated in a state of being superimposed on the face image. Furthermore, at this time, the balance evaluation analysis unit 92 determines a ratio of the vertical direction to the lateral direction of the contour of the face image as a vertical-lateral face balance and displays the vertical-lateral face balance being superimposed on the face image. In FIG. 17, the vertical direction and the lateral direction of the contour of the face image as the vertical-lateral face balance are displayed at a ratio of 4:3. Furthermore, the balance evaluation analysis unit 92 provides a comment box 301 at a lower part of the face image, i.e., at a lower part of the display unit 82, and displays a comment related to the vertical-lateral face balance. In FIG. 17, the comment box 301 displays "vertical-lateral face balance (normal)", indicating that the vertical-lateral face balance is normal.

In step S33, the balance evaluation analysis unit 92 generates the best balance face image on the basis of the aforementioned conditions on the basis of the feature point correction information 182. In other words, the balance evaluation analysis unit 92 determines the size and arrangement of various parts to satisfy the conditions defined as the best balance face image depending on the contour detected on the basis of the feature point so as to generate the best balance face image.

Figure 18:
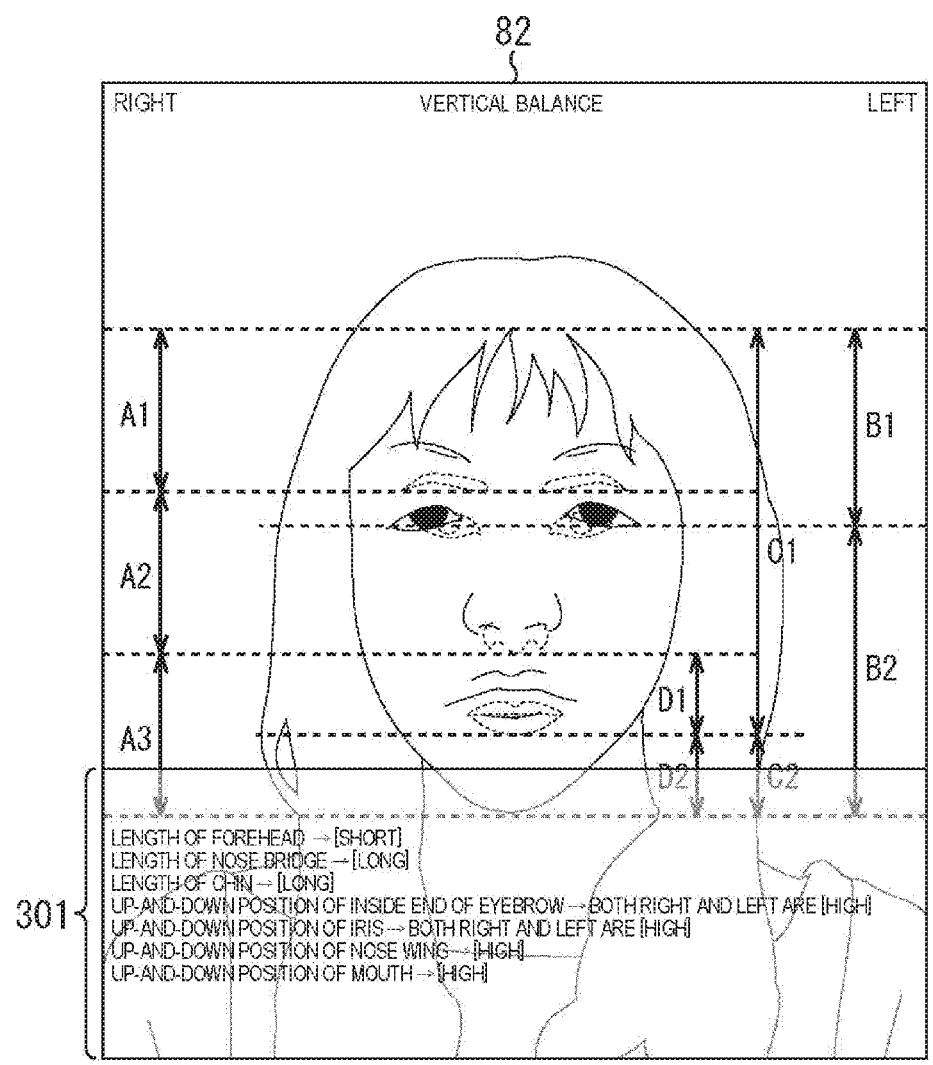
FIG. 18 is a diagram explaining a display example of balance evaluation processing.

In step S34, the balance evaluation analysis unit 92 detects the balance in the vertical direction of the face image on the basis of the feature point correction information 182 and causes the display unit 82 to display the balance image in the vertical direction as illustrated, for example, in FIG. 18.

In the balance image in the vertical direction of FIG. 18, the eyes, the nose, the lips, the eyebrows or the like of the best balance face image are indicated by the dotted lines. As illustrated on the left side of the drawing, a length A1 from the hairline to the inside end of the eyebrow, a length A2 from the inside end of the eyebrow to under the nose, and a length A3 from under the nose to the chin of the best balance face image are illustrated. Furthermore, as illustrated on the right side of the drawing, a length B1 from the hairline to the outer corner of the eye and a length B2 from the outer corner of the eye to the chin of the best balance face image are illustrated. Moreover, a length C1 from the hairline to under the lip and a length C2 from under the lip to the chin of the best balance face image are illustrated. A length D1 from under the nose to under the lip and a length D2 from under the lip to the chin of the best balance face image are illustrated.

The balance evaluation analysis unit 92, on the basis of the lengths A1 to A3, the lengths B1 and B2, the lengths C1 and C2, and the lengths D1 and D2, displays, in the comment box 301, the relationship of the length of the chin, the length of the nose bridge, the length of the chin, the up-and-down position of the inside end of the eyebrow, the up-and-down position of the iris, the up-and-down position of the nose wing, and the up-and-down position of the mouth with respect to the best balance face image.

The comment box 301 of FIG. 18 reads "[short]", indicating that the length of the chin is shorter relative to the best balance face image. Furthermore, the length of the nose bridge is "[long]", indicating that it is longer relative to the best balance face image. Moreover, the length of the chin is "[long]", indicating that it is longer relative to the best balance face image. Regarding the up-and-down position of the inside end of the eyebrow, "both right and left are [high]", indicating that both the right and the left are higher relative to the best balance face image. Regarding the up-and-down position of the iris, "both right and left are [high]", indicating that both the right and the left are higher relative to the best balance face image. The up-and-down position of the nose wing is "[high]", indicating that it is higher relative to the best balance face image. The up-and-down position of the mouth is "[high]", indicating that it is higher relative to the best balance face image.

Figure 19:
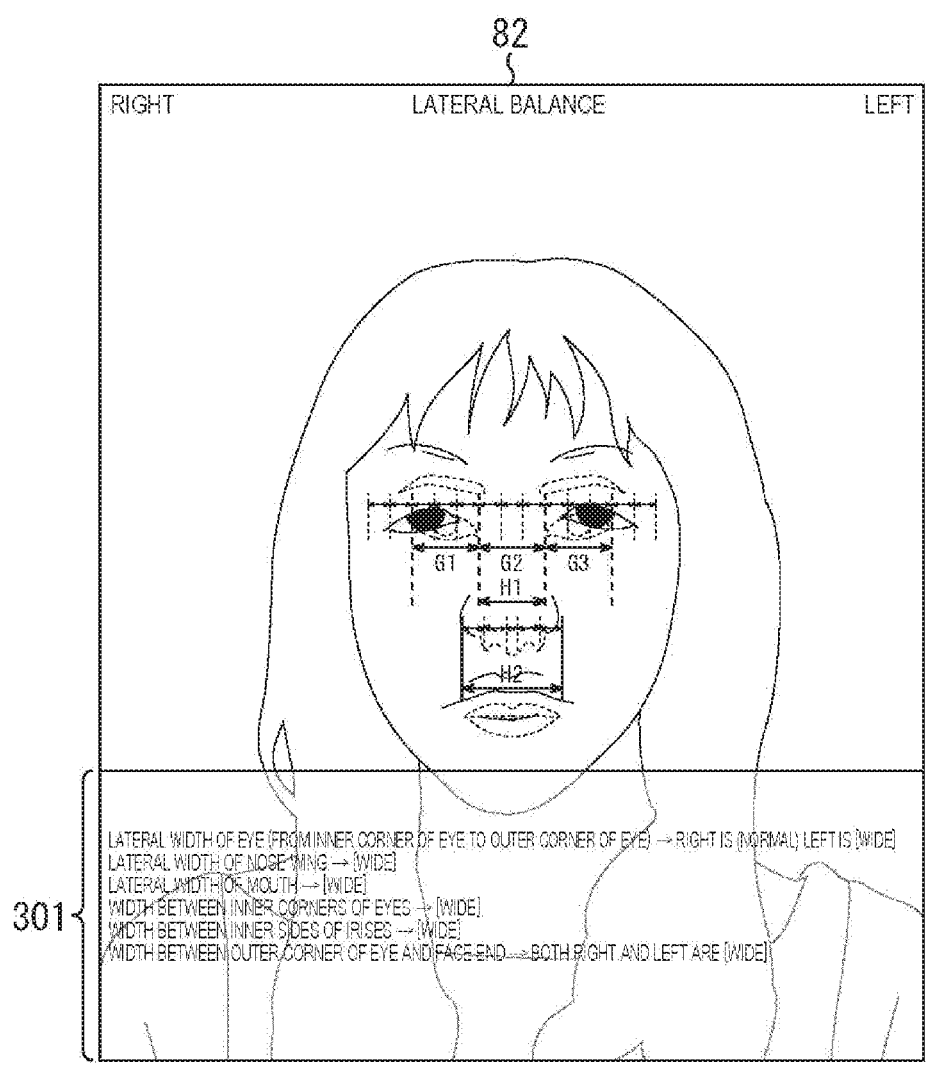
FIG. 19 is a diagram explaining a display example of balance evaluation processing.

In step S35, the balance evaluation analysis unit 92 detects the balance in the lateral direction of the face image on the basis of the feature point correction information 182 and controls the display unit 82 to display the balance image in the lateral direction as illustrated, for example, in FIG. 19.

In the balance image in the lateral direction of FIG. 19, the eyes, the nose, the lips, the eyebrows, and the like of the best balance face image are indicated by the dotted lines. A width G1 of the right eye, a width G2 between the right and left eyes, and a width G3 of the left eye of the best balance face image are indicated. Furthermore, a width H1 of the nose wing and a width H2 of the lip are indicated. Moreover, spaces with reference to the width of the iris in the lateral direction are indicated.

The balance evaluation analysis unit 92, on the basis of widths G1 to G3, the widths H1 and H2, and the spaces with reference to the width of the iris, displays in the comment box 301 the relationship of the lateral width of the outer corner of the eye, the lateral width of the nose wing, the lateral width of the mouth, the width between the inner corners of the eyes, and the width between the outer corner of the eye and the face end with respect to the best balance face image.

In FIG. 19, regarding the lateral width of the outer corner of the eye (from the inner corner of the eye to the outer corner of the eye), "right is (normal), left is [wide]", indicating that the right side is normal width and the left side is wide relative to the best balance face image. Furthermore, the lateral width of the nose wing is "[wide]", indicating that it is wider relative to the best balance face image. Moreover, the lateral width of the mouth is "[wide]", indicating that it is wider relative to the best balance face image. Furthermore, the width between the inner corners of the eyes is "[wide]", indicating that it is wider relative to the best balance face image. Moreover, the width between the outer corner of the eye and the face end is "[wide]", indicating that it is wider relative to the best balance face image.

Figure 20:
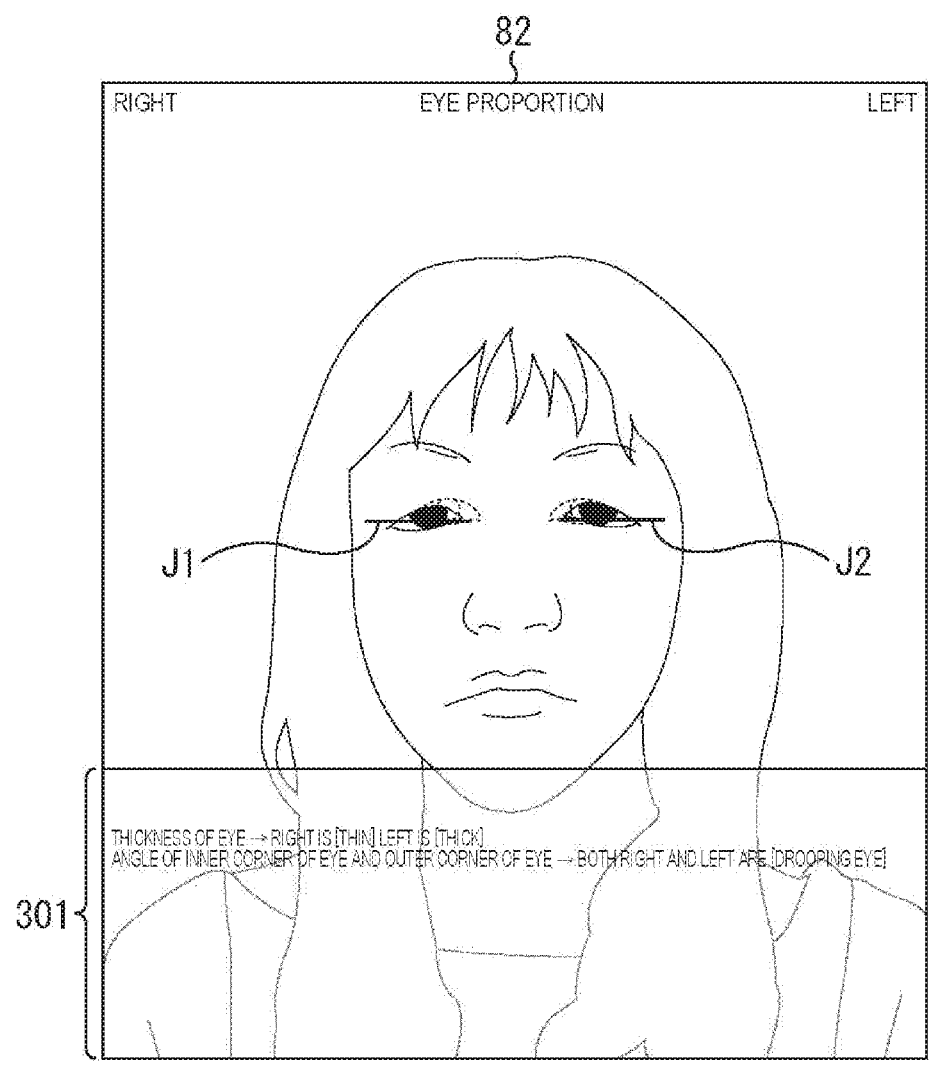
FIG. 20 is a diagram explaining a display example of balance evaluation processing.

In step S36, the balance evaluation analysis unit 92 detects the eye proportion on the basis of the feature point correction information 182 and causes the display unit 82 to display the eye proportion image as illustrated, for example, in FIG. 20.

In the eye proportion image of FIG. 20, the eyes of the best balance face image are indicated by the dotted lines, and straight lines J1 and J2 indicating the height of the outer corners of the eyes of the user's face image are indicated.

The balance evaluation analysis unit 92 displays the position of the eyes of the best balance face image and the relationship between the best balance face image and the thickness of the eyes and the angle of the inner corner of the eye and the outer corner of the eye on the basis of the straight lines J1 and J2 indicating the height of the outer corner of the eye of the user's face image in the comment box 301.

In FIG. 20, regarding the thickness of the eyes, "right is [thin], left is [thick]", indicating that the thickness of the right eye is thinner and the thickness of the left eye is thicker relative to the best balance face image. Regarding the angle of the inner corner of the eye and the outer corner of the eye, "both right and left are [drooping eye]", indicating that both the right and the left are a drooping eye relative to the best balance face image.

Figure 21:
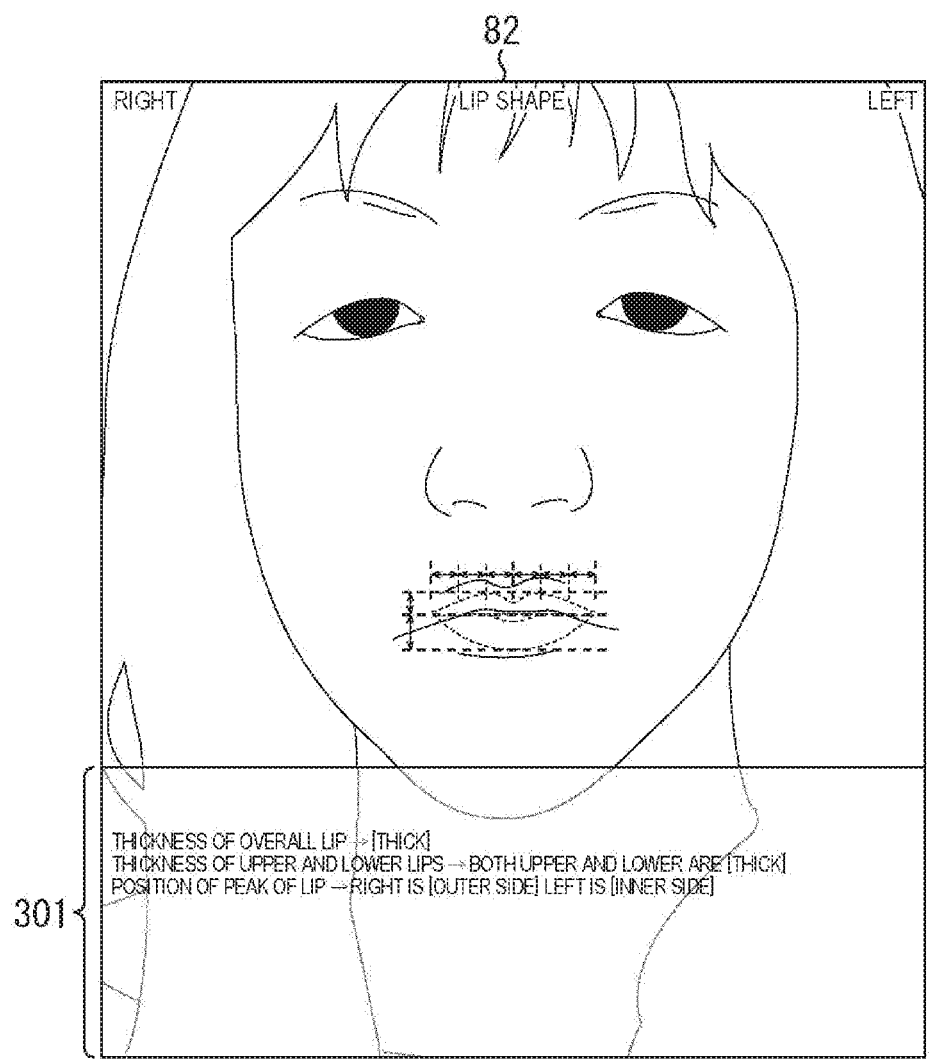
FIG. 21 is a diagram explaining a display example of balance evaluation processing.

In step S37, the balance evaluation analysis unit 92 detects the shape of the lip on the basis of the feature point correction information 182 and controls the display unit 82 to display a lip shape image as illustrated, for example, in FIG. 21.

In the lip shape image of FIG. 21, the mouth of the best balance face image is indicated by the dotted line, and the space of the width between the peak and the valley of the lip in the lateral direction of the mouth of the best balance face image is indicated.

The balance evaluation analysis unit 92 displays the relationship between the best balance face image and the thickness of the overall lip, the thickness of the upper and lower lips, and the positions of the peaks of the lip in the comment box 301 on the basis of the position of the mouth of the best balance face image and the space of the width between the peak and the valley in the lateral direction.

The thickness of the entire lip in FIG. 21 is "[thick]", indicating that the thickness of the lip is thicker relative to the best balance face image. The thickness of the upper and lower lips is "[thick]", indicating that the thickness of the upper and lower lips is thicker relative to the best balance face image. Regarding the position of the peaks of the lip, "right is [outer side], left is [inner side]", indicating that the right is on an outer side and the right is on an inner side regarding the positions of the peaks of the lip relative to the best balance face image.

Figure 22:
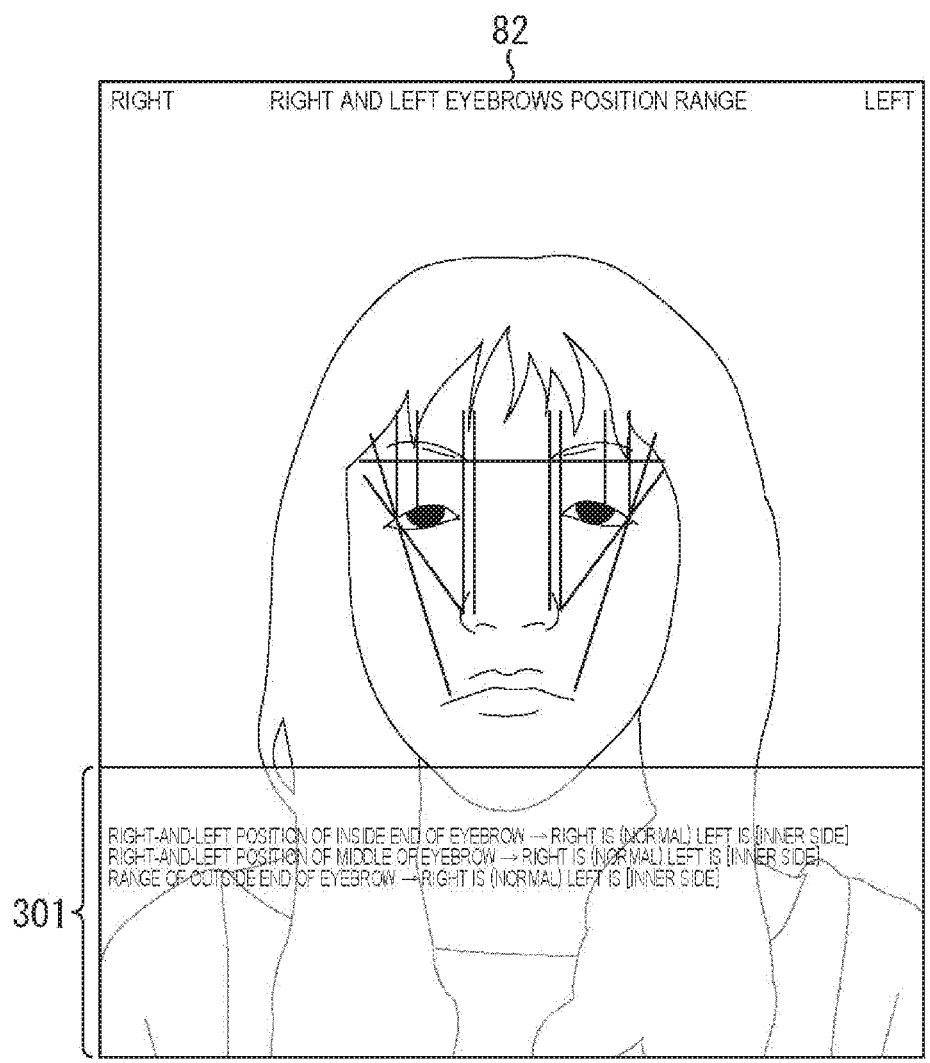
FIG. 22 is a diagram explaining a display example of balance evaluation processing.

In step S38, the balance evaluation analysis unit 92 detects the position range of the right and left eyebrows on the basis of the feature point correction information 182 and causes the display unit 82 to display the position range of the right and left eyebrows as illustrated, for example, in FIG. 22.

In the position range of the right and left eyebrows of FIG. 22, the ranges of the inside end of the eyebrow, the middle of the eyebrow, and the outside end of the eyebrow of the user's face image are indicated by the lines.

The balance evaluation analysis unit 92, on the basis of the lines of the ranges of the inside end of the eyebrow, the middle of the eyebrow, and the outside end of the eyebrow of the user's face image, displays in the comment box 301 the relationship between the best balance face image and the right-and-left position of the inside end of the eyebrow, the right-and-left position of the middle of the eyebrow, and the range of the outside end of the eyebrow.

In FIG. 22, regarding the right-and-left position of the inside end of the eyebrow, "right is (normal), left is [inner side]", indicating that the right side is in a normal position and the left side is on an inner side regarding the right-and-left position of the inside end of the eyebrow relative to the best balance face image. Regarding the right-and-left position of the middle of the eyebrow, "right is (normal), left is [inner side]", indicating that the right side is in a normal position and the left side is on an inner side regarding the right-and-left position of the middle of the eyebrow relative to the best balance face image. Regarding the range of the outside end of the eyebrow, "right is (normal), left is [inner side]", indicating that the right side is in a normal position and the left side is on an inner side regarding the range of the outside end of the eyebrow relative to the best balance face image.

Figure 23:
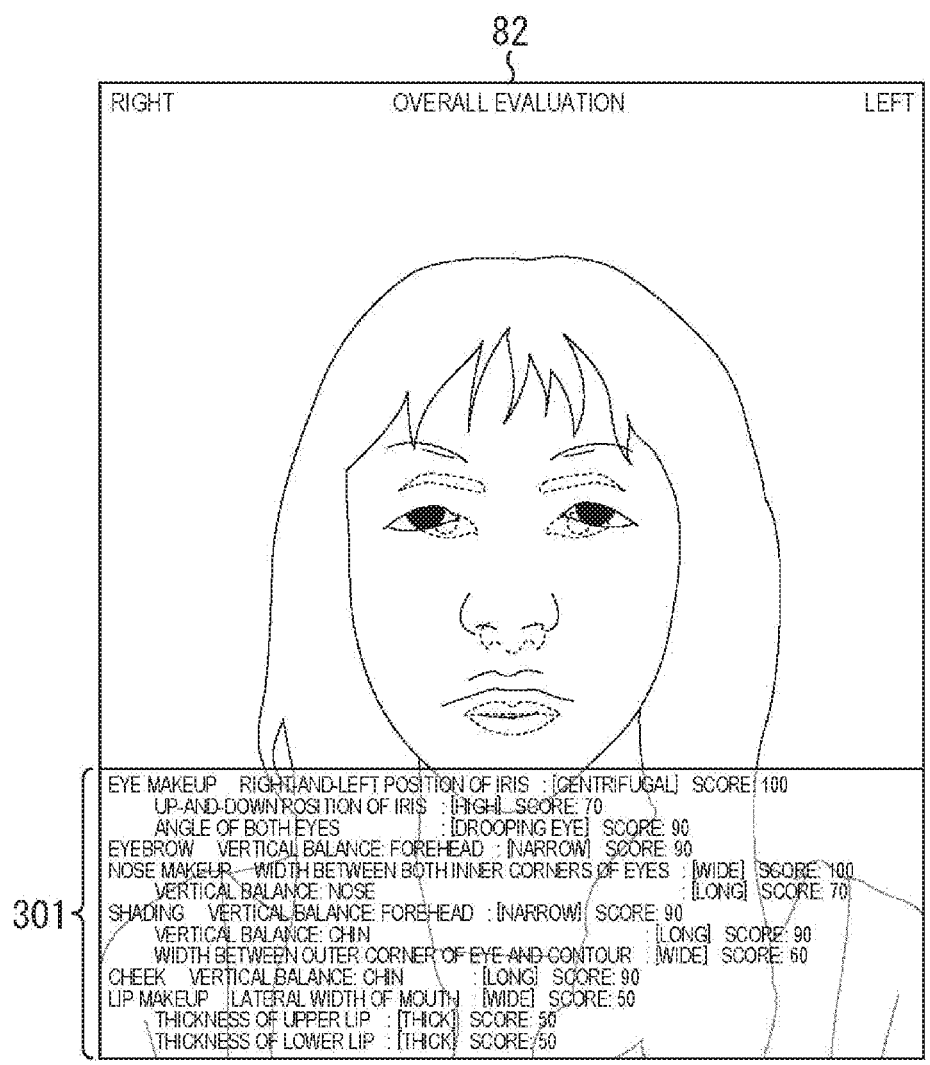
FIG. 23 is a diagram explaining a display example of balance evaluation processing.

In step S39, the balance evaluation analysis unit 92, on the basis of the balance evaluation analysis result up to now, determines the overall evaluation and causes the display unit 82 to display an overall evaluation image as illustrated, for example, in FIG. 23.

In the overall evaluation image of FIG. 23, the parts of the best balance face image are indicated by the dotted lines and displayed by being superimposed on the user's face image.

The balance evaluation analysis unit 92 displays the overall evaluation of the makeup of each part in the comment box 301.

In FIG. 23, the comment box 301 displays, from the top, scores from 0 to 100 relative to the best balance face image for the right-and-left position of the iris, the up-and-down position of the iris, and the angle of both eyes corresponding to eye makeup, the vertical balance of the forehead corresponding to the eyebrow, the width between both inner corners of the eyes and the vertical balance of the nose corresponding to nose makeup, the vertical balance of the forehead, the lateral balance of the chin, the width between the outer corner of the eye and the contour corresponding to shading, the vertical balance of the chin relative to the cheek, and the lateral width of the mouth, the thickness of the upper lip, and the thickness of the lower lip corresponding to lip makeup. Each score is higher when each part of the user's face image is distant from arrangement or the like of each part of the best balance face image.

More specifically, the right-and-left position of the iris corresponding to eye makeup is "[centrifugal] score 100", indicating that the right-and-left position of the iris is distant from the center between the right and left to the outside and is centrifugal relative to the position of the best balance face image, indicating that the score is 100. The up-and-down position of the iris is "[high] score 70", indicating that the up-and-down position of the iris is in a position higher than the position of the best balance face image and the score is 70. The angle of both eyes is "[drooping eye] score 90", indicating that the angle of both eyes is smaller than the angle of the best balance face image and the eyes are drooping, indicating that the score is 90.

Furthermore, the vertical balance of the forehead corresponding to eyebrow is "[narrow] score 90", indicating that the vertical balance of the forehead is narrower than the width of the best balance face image and the score is 90.

Moreover, the width between both inner corners of the eyes corresponding to nose makeup is "[wide] score 100", indicating that the width between both inner corners of the eyes is wider than the width of the best balance face image and the score is 100. The vertical balance of the nose is "[long] score 70", indicating that the vertical balance of the nose is longer than the length of the best balance face image and the score is 70.

The vertical balance of the chin corresponding to shading is "[narrow] score 90", indicating that the vertical balance of the chin is narrower than the length of the best balance face image and the score is 90. The lateral balance of the chin is "[long] score 90", indicating that the lateral balance of the chin is longer than the length of the best balance face image and the score is 90. The width between the outer corner of the eye and the contour is "[wide] score 60", indicating that the width between the outer corner of the eye and the contour is wider than the width of the best balance face image and the score is 60.

The vertical balance of the chin corresponding to cheek is "[long] score 90", indicating that the vertical balance of the chin is longer than the length of the best balance face image and the score is 90.

The lateral width of the mouth corresponding to lip makeup is "[wide] score 50", indicating that the lateral width of the mouth is wider than the width of the best balance face image and the score is 50. The thickness of the upper lip is "[thick] score 50", indicating that the thickness of the upper lip is thicker than the thickness of the best balance face image and the score is 50. The thickness of the lower lip is "[thick] score 50", indicating that the thickness of the lower lip is thicker than the thickness of the best balance face image and the score is 50.

In step S40, the balance evaluation analysis unit 92 generates a right half composite image generated by using a right half of the user's face image relative to the central line in the lateral direction for the left half, and a left half composite image generated using a left half for the right half.

Figure 24:
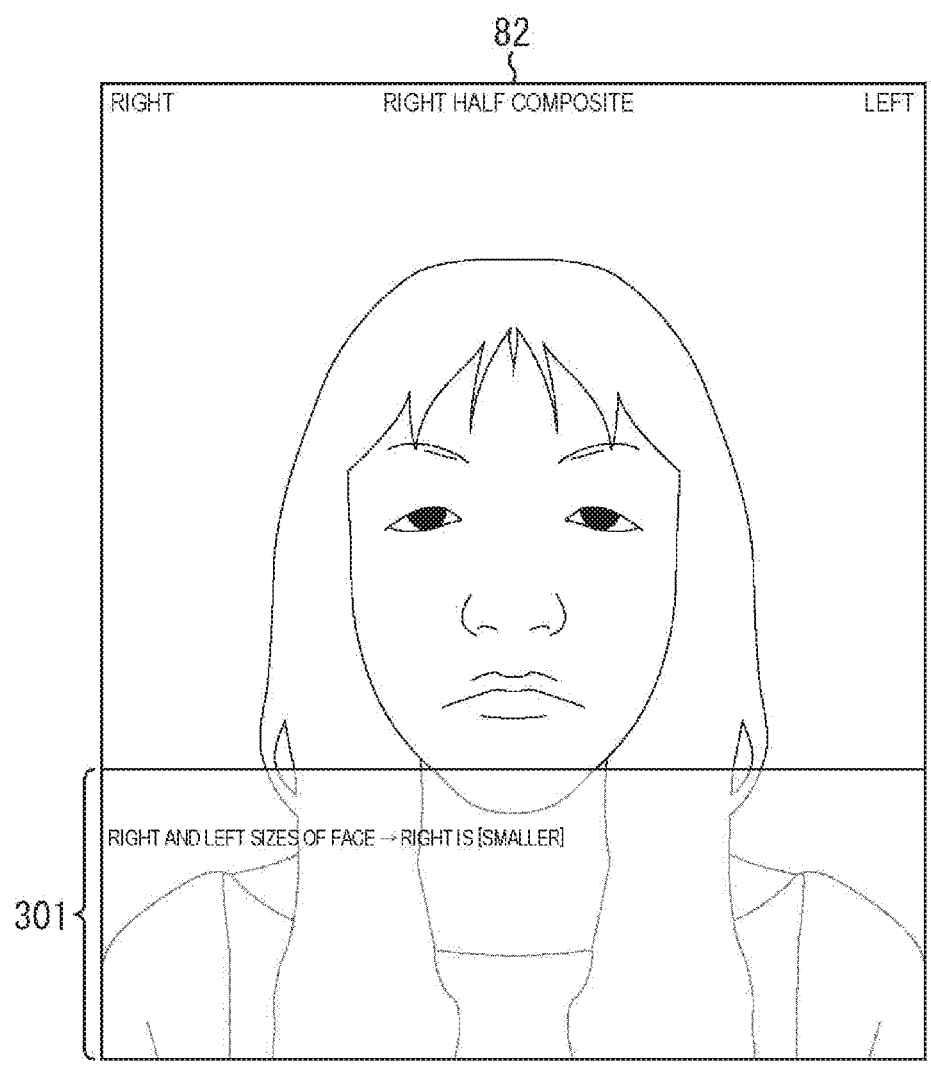
FIG. 24 is a diagram explaining a display example of balance evaluation processing.
Figure 25:
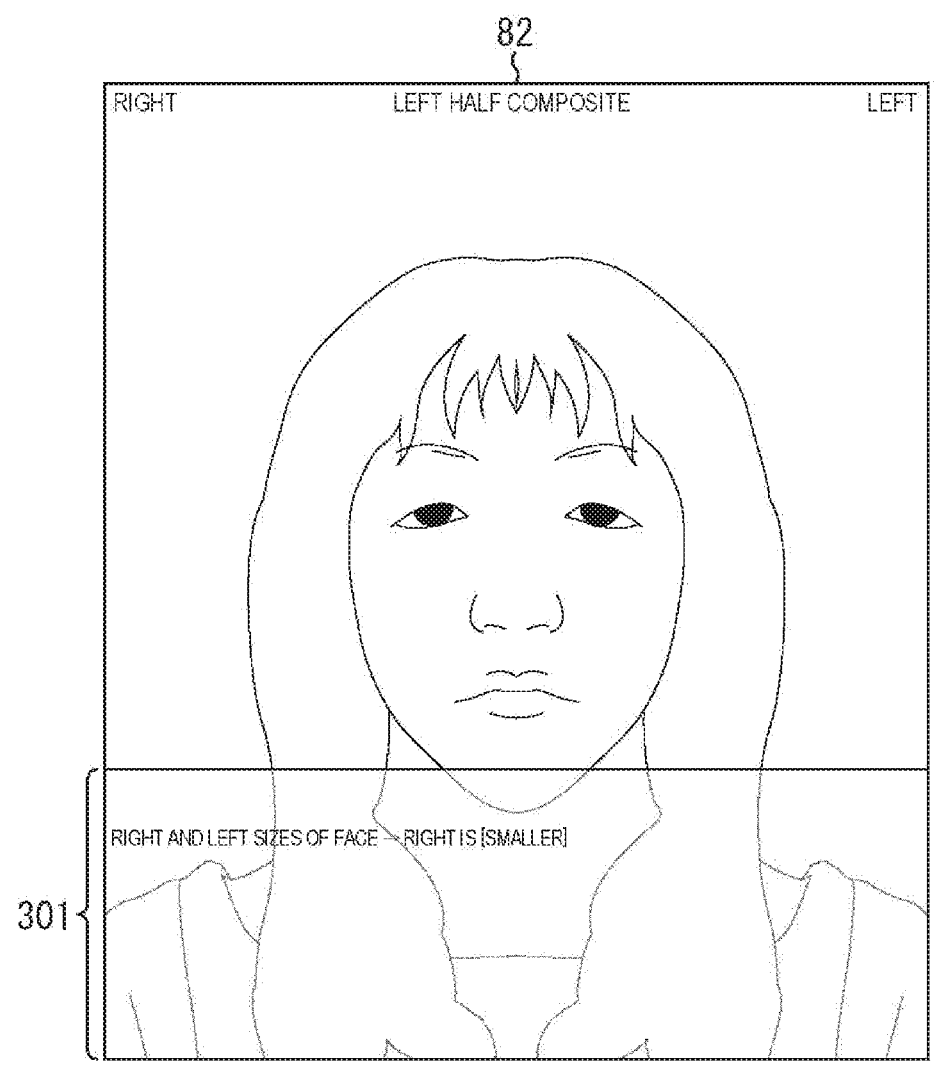
FIG. 25 is a diagram explaining a display example of balance evaluation processing.

In step S41, the balance evaluation analysis unit 92 causes the display unit 82 to display, for example, a right half image of FIG. 24 and a left half image of FIG. 25.

The right half composite image of FIG. 24 includes a face image in which the right half face image of the user's face image is applied to the left half. The balance evaluation analysis unit 92, as a result of a comparison between the right half and the left half of the face image, displays "right is [smaller]" regarding the right and left sizes of the face in the comment box 301, indicating that the right half of the face image is smaller than the left half.

The left half composite image of FIG. 25 includes a face image in which the left half face image of the user's face image is applied to the right half. The balance evaluation analysis unit 92, as a result of a comparison between the right half and the left half of the face image, displays "right is [smaller]" regarding the right and left sizes of the face in the comment box 301, indicating that the right half of the face image is smaller than the left half.

By the processing described above, the balance evaluation processing is executed. Balance evaluation information for generating makeup to be worn such that the user's face image is closer to the best balance face image is generated, and evaluation results are indicated.

Here, the flowchart of FIG. 13 is described again.

Figure 26:
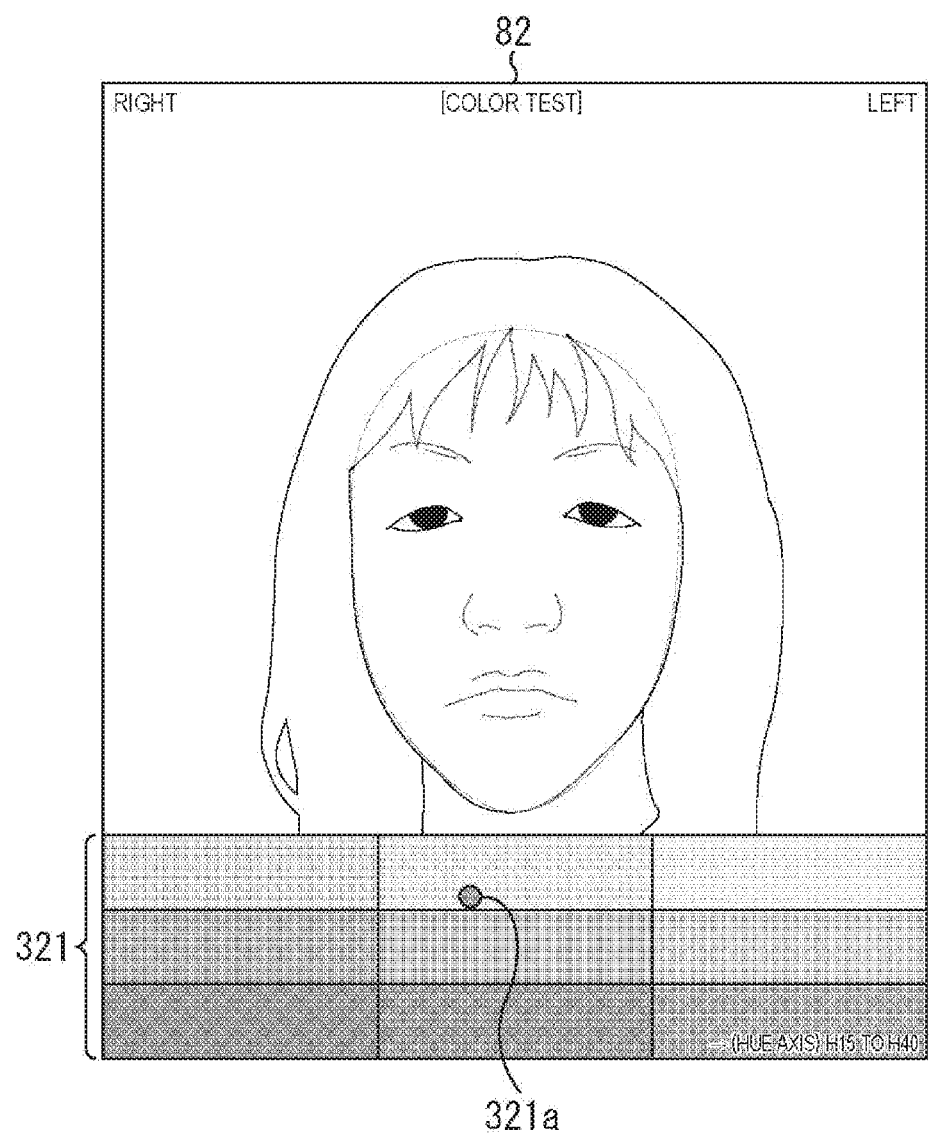
FIG. 26 is a diagram explaining a display example of balance evaluation processing.

In step S18, the control unit 83 controls the color analysis unit 94 to analyze what skin color the user's face skin color has on the basis of the user's face image, and displays a color test image illustrated, for example, in FIG. 26 on the display unit 82 as a color analysis result.

In the color test image of FIG. 26, the user's face image is displayed on an upper part, and at a lower part a color palette 321 in which a plurality of, three-by-three, skin colors is arranged is displayed. A pointer 321a is indicated on the palette corresponding to the skin color of the user's face image. Furthermore, at this time, the color analysis unit 94 registers the color analysis results in the color analysis result information 184 of the balance face information 152.

Figure 27:
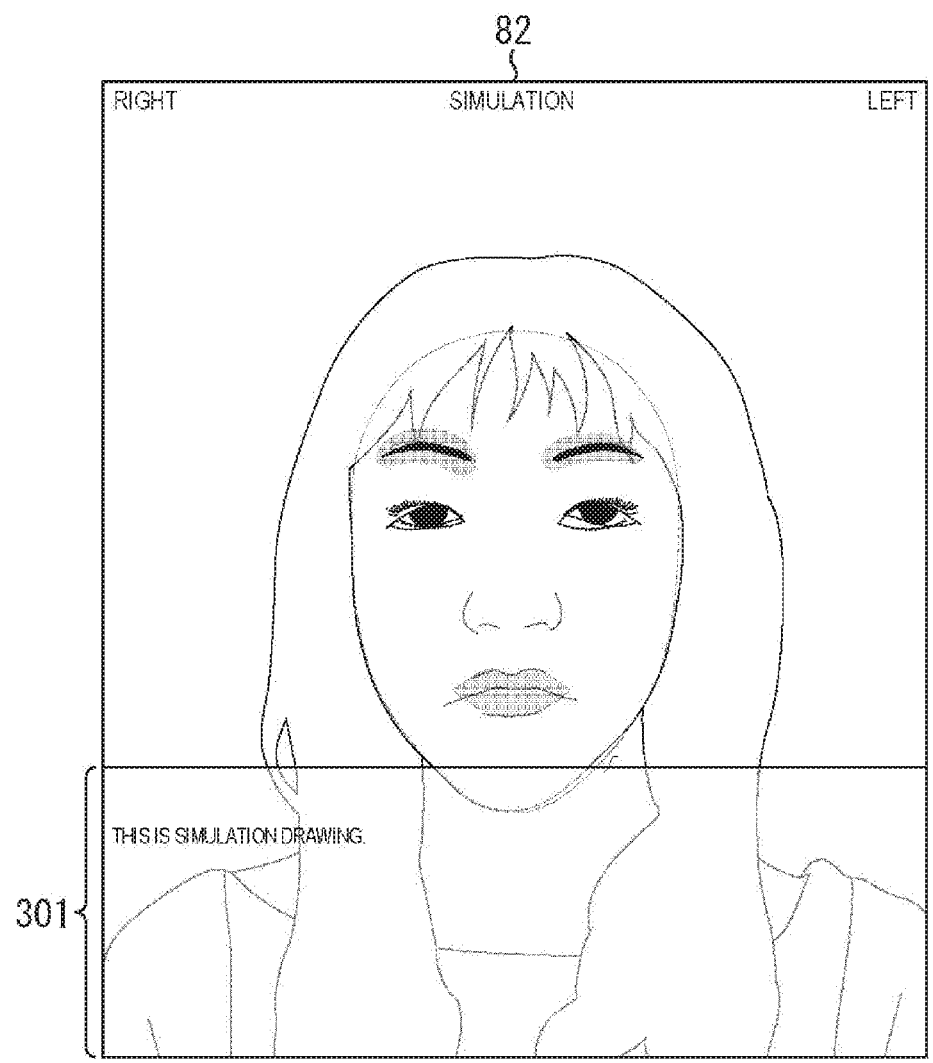
FIG. 27 is a diagram explaining a display example of balance evaluation processing.

In step S19, the makeup setting unit 93, on the basis of the balance evaluation information and the color analysis results, executes simulation for setting makeup that brings the parts of the user's face image closer to the parts of the best balance face image, and displays the simulation result in a case where the makeup obtained by the simulation is made on the user's face image as a simulation image as illustrated, for example, in FIG. 27.

In other words, the balance evaluation analysis unit 92 has evaluation results in which a larger difference between the arrangement of each part of the user's face image and the arrangement of each part of the best balance face image is scored to be a higher score. Thus, the makeup setting unit 93 executes simulation that makes various makeup relative to the user's face image and determines makeup that has minimum scores in comparison between the face image after makeup and the best balance face image so as to determine makeup that can bring the user's face image closer to the best balance face image by means of simulation. In this simulation, the makeup setting unit 93 changes and repeats makeup that is based on the concept of the method of setting makeup relative to the balance evaluation result described with reference to FIG. 12 described above. Furthermore, at this time, the makeup setting unit 93 registers the score information based on the makeup obtained by the simulation on the balance recipe result information 184 of the balance face information 152.

In the simulation image of FIG. 27, at an upper stage, the face image in a case where the makeup obtained by the simulation is made on the user's face image is displayed. Furthermore, the comment box 301 at a lower stage of FIG. 27 reads "this is a simulation image.", indicating that the user's face image at the upper stage is a face image on which the makeup obtained by the simulation is made.

In step S20, the recipe image display control unit 95 executes recipe image display processing and displays recipe images in sequence. Here, the comment box 301 reads "this is a simulation drawing.", indicating that a face image obtained when the makeup obtained by the simulation is made on the user's face image is displayed.

With such processing, the user can imagine a state in which makeup that brings the face image to the best balance face image is made by viewing the simulation image.

Note that, for the processing of each of subsequent steps including step S20, each step is progressed in sequence by the operation of the operation unit 86. Furthermore, in the subsequent processing, the user checks the displayed content and proceeds to the next step at the timing the user desires. The description of the operation is wordy and is therefore omitted. Moreover, for each processing of the subsequent steps including step S20, the processing may be returned to the previous step by the operation of the operation unit 86 as necessary such that the user can review the previous processing.

<Recipe Image Display Processing>

Figure 28:
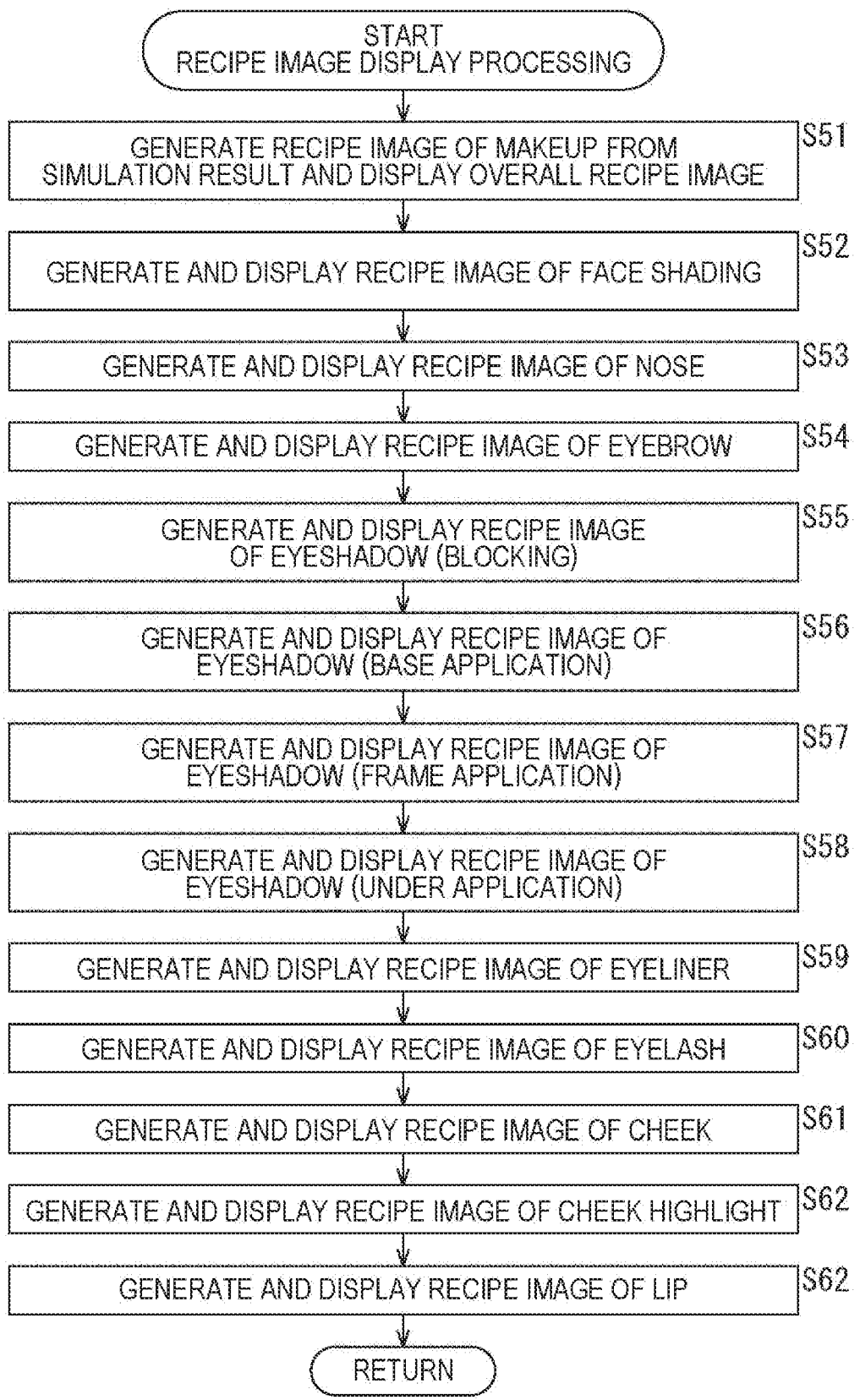
FIG. 28 is a flowchart explaining recipe image display processing.

Here, with reference to a flowchart of FIG. 28, description of the recipe image display processing is given.

In step S51, the recipe image display control unit 95 generates a recipe image 191 displaying a process of wearing corresponding makeup from the makeup simulation results based on the balance evaluation information and the color analysis result, generates corresponding recipe image management information 192 and registers them in the terminal database 131 as recipe display information 153. Moreover, the recipe image display control unit 95 displays on the display unit 82 the overall recipe image as illustrated, for example, in FIG. 29.

Figure 29:
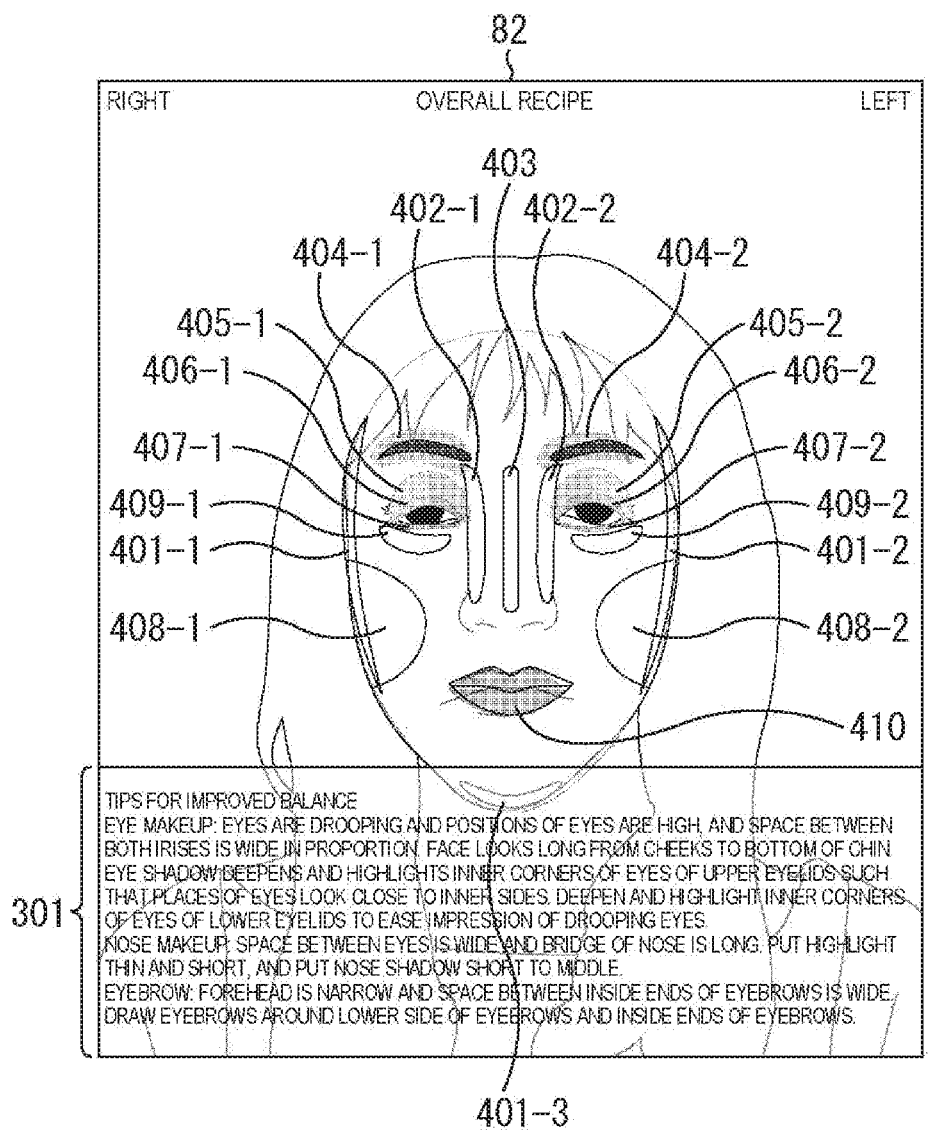
FIG. 29 is a diagram explaining a display example of recipe image display processing.

In the overall recipe image of FIG. 29, the overall recipe of makeup to be worn on each part of the user's face image is displayed in a superimposed manner. In more detail, the overall recipe image of the makeup of FIG. 29 displays specific recipes of makeup to be worn: face shading recipes 401-1 to 401-3, nose recipes 402-1, 402-2 and 403, eyebrow recipes 404-1 and 404-2, eyeshadow recipes 405-1, 405-2, 406-1, 406-2, 407-1 and 407-2, cheek recipes 408-1 and 408-2, cheek highlight recipes 409-1 and 409-2, and a lip recipe 410. In other words, the user wears each makeup, which is based on individual recipes of the overall recipe image illustrated in FIG. 29, on each part of the user's own face. Thus, it is possible to realize makeup of the face image corresponding to the simulation result image illustrated in FIG. 27.

Furthermore, the comment box 301 reads "tips for improved balance" as follows: "Eye Makeup: The eyes are drooping and the positions of the eyes are high, and the space between the both irises is wide in the proportion. The face looks long from the cheeks to the bottom of the chin. Eye shadow deepens and highlights the inner corners of the eyes of the upper eyelids such that the places of the eyes look closer to the inner sides. Deepen and highlight the inner corners of the eyes of the lower eyelids to ease the impression of the drooping eyes. Nose Makeup: The space between the eyes is wide and the bridge of the nose is long. Put highlight thinly and short, and put nose shadow short to the middle. Eyebrow: The forehead is narrow and the space between the inside ends of the eyebrows is wide. Draw eyebrows around the lower side of the eyebrows and the inside ends of the eyebrows . . . ." The comment box 301 describes specific notes as points for each part during makeup. The user can realize makeup that brings the face image closer to the best balance face image by wearing makeup with attention to these points.

Figure 30:
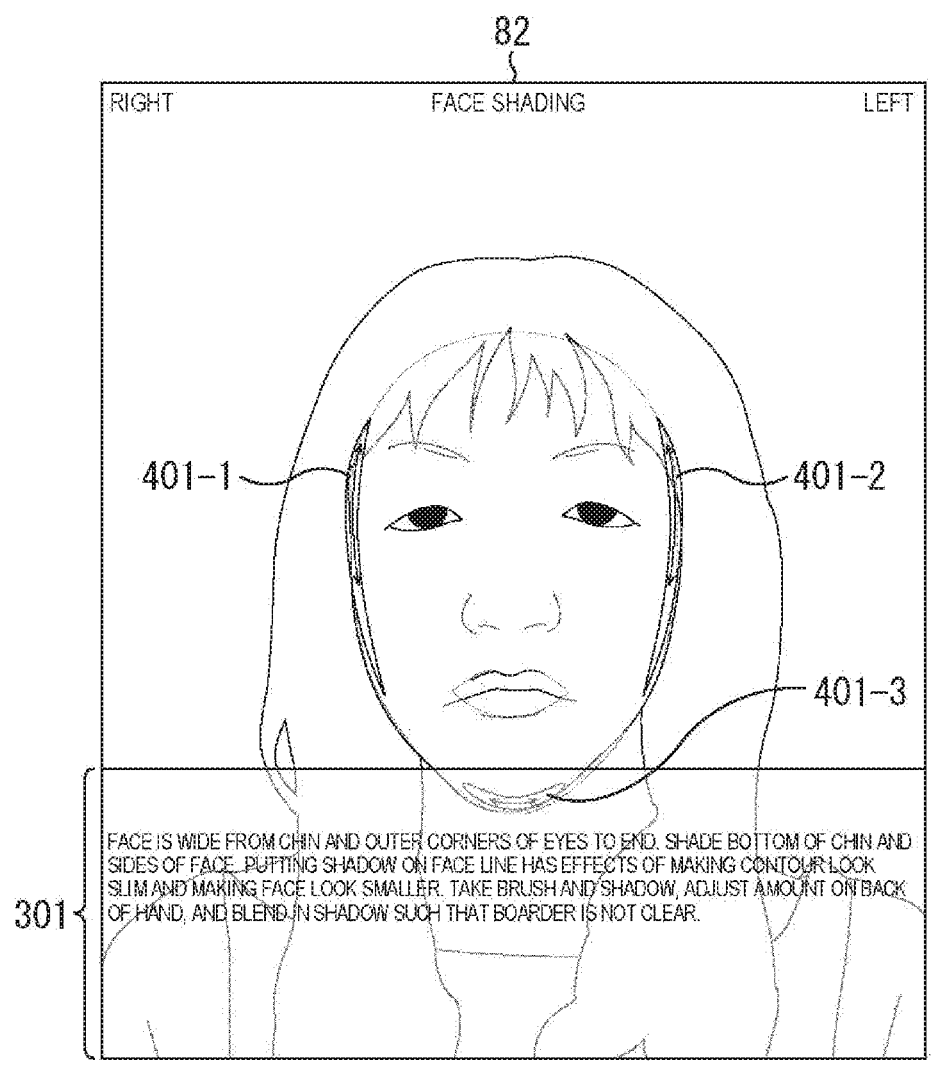
FIG. 30 is a diagram explaining a display example of recipe image display processing.

In step S52, the recipe image display control unit 95 displays the recipe image of the face shading on the display unit 82 as illustrated, for example, in FIG. 30.

The recipe image of the face shading of FIG. 30 indicates directions of shading to be worn as indicated by the arrow directions of the face shading recipes 401-1 to 401-3 in the user's face image.

Furthermore, the comment box 301 reads "The face is wide from the chin and the outer corners of the eyes to the end. Shade the bottom of the chin and the sides of the face. Putting shadow on the face line has effects of making the contour look slim and making the face look smaller. Take a brush and shadow, adjust the amount on the back of the hand, and blend in the shadow such that the boarder is not clear." The comment box 301 indicates points of the face shading based on the balance evaluation result.

Figure 31:
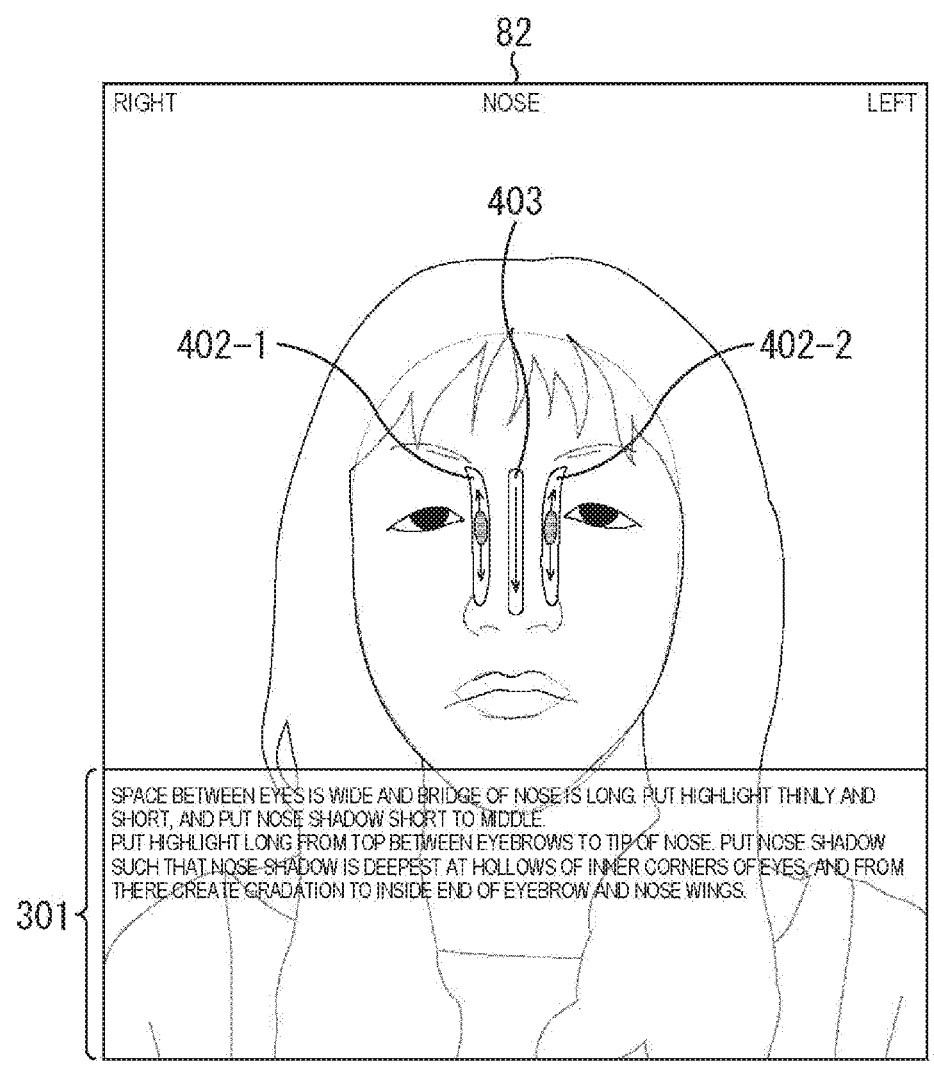
FIG. 31 is a diagram explaining a display example of recipe image display processing.

In step S53, the recipe image display control unit 95 displays the recipe image of the nose on the display unit 82 as illustrated, for example, in FIG. 31.

In the recipe image of the nose of FIG. 31, the nose recipes 402-1, 402-2, and 403 indicate a specific method of makeup of nose shadow. In other words, the nose recipes 402-1 and 402-2 indicate how to put shadow on the right and left of the nose, and the nose recipe 403 indicates how to put highlight on the nose.

Furthermore, the comment box 301 reads "The space between the eyes is wide and the bridge of the nose is long. Put highlight thinly and short, and put nose shadow short to the middle. Put highlight long from the top between the eyebrows to the tip of the nose. Put nose shadow such that the nose shadow is the deepest at the hollows of the inner corners of the eyes, and from there create gradation to the inside end of the eyebrow and the nose wings." The comment box 301 indicates points of makeup of the nose based on the balance evaluation result.

Figure 32:
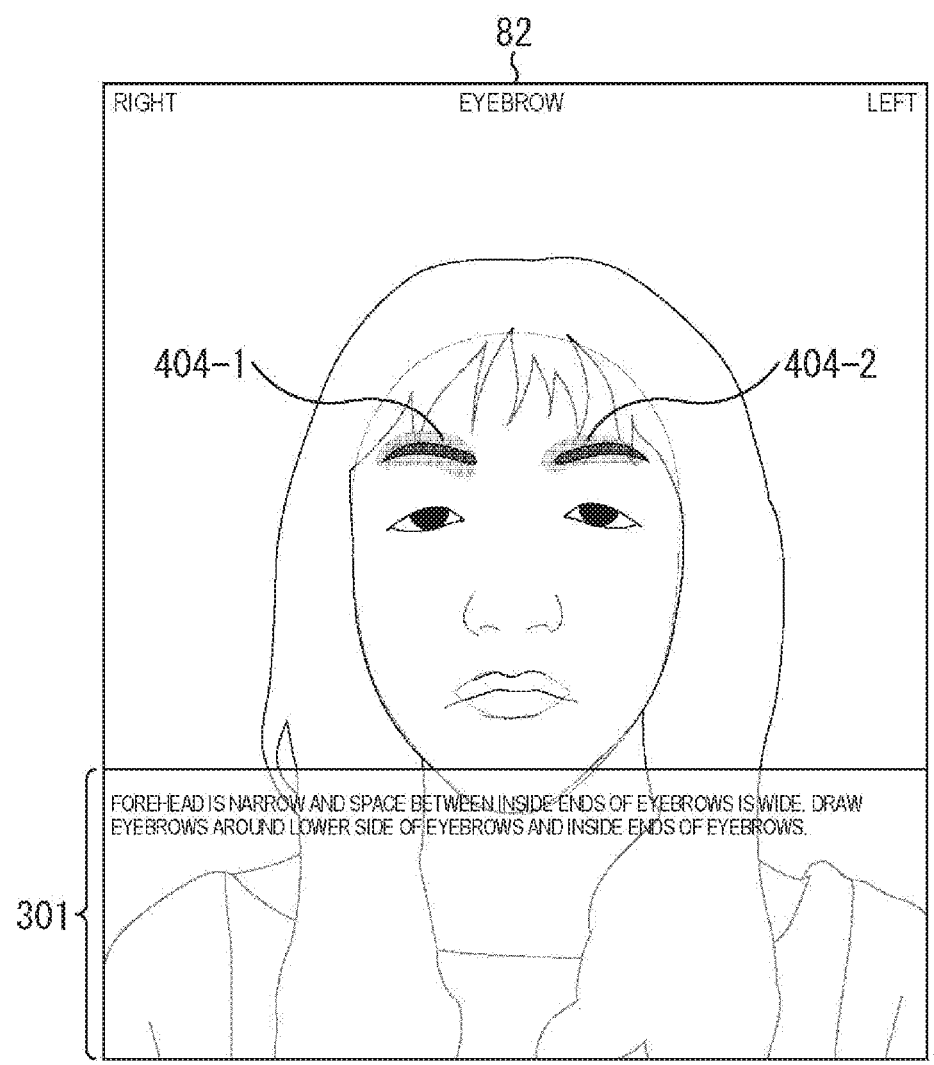
FIG. 32 is a diagram explaining a display example of recipe image display processing.

In step S54, the recipe image display control unit 95 displays the recipe image of eyebrow on the display unit 82 as illustrated, for example, in FIG. 32.

In the recipe image of the eyebrow of FIG. 32, the eyebrow recipes 404-1 and 404-2 indicate a specific method of makeup of the eyebrow.

Furthermore, the comment box 301 reads "The forehead is narrow and the space between the inside ends of the eyebrows is wide. Draw eyebrows around the lower side of the eyebrows and the inside ends of the eyebrows.", and indicates point of makeup of the eyebrow based on the balance evaluation result.

Figure 33:
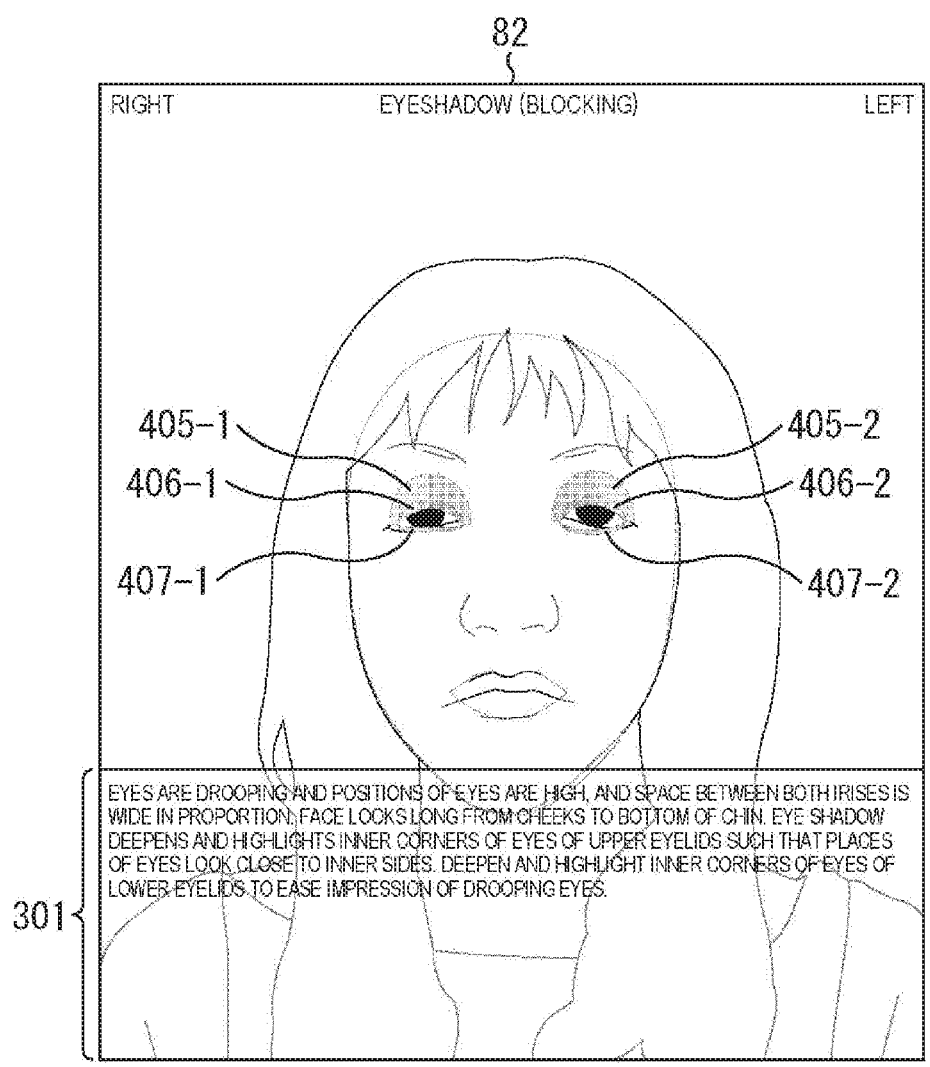
FIG. 33 is a diagram explaining a display example of recipe image display processing.

In step S55, the recipe image display control unit 95 displays the recipe image of eyeshadow (blocking) on the display unit 82 as illustrated, for example, in FIG. 33.

In the recipe image of the eyeshadow (blocking) of FIG. 33, the eyeshadow (blocking) recipes 405-1, 405-2, 406-1, 406-2, 407-1, and 407-2 indicate a specific method of makeup of the eyeshadow (blocking) and indicate palette colors used with respect to each position.

Furthermore, the comment box 301 reads "The eyes are drooping and the positions of the eyes are high, and the space between the both irises is wide in the proportion. The face looks long from the cheeks to the bottom of the chin. Eye shadow deepens and highlights the inner corners of the eyes of the upper eyelids such that the places of the eyes look on the inner sides. Deepen and highlight the inner corners of the eyes of the lower eyelids to ease the impression of the drooping eyes." The comment box 301 indicates points of makeup of the eyeshadow (blocking) based on the balance evaluation result.

Figure 34:
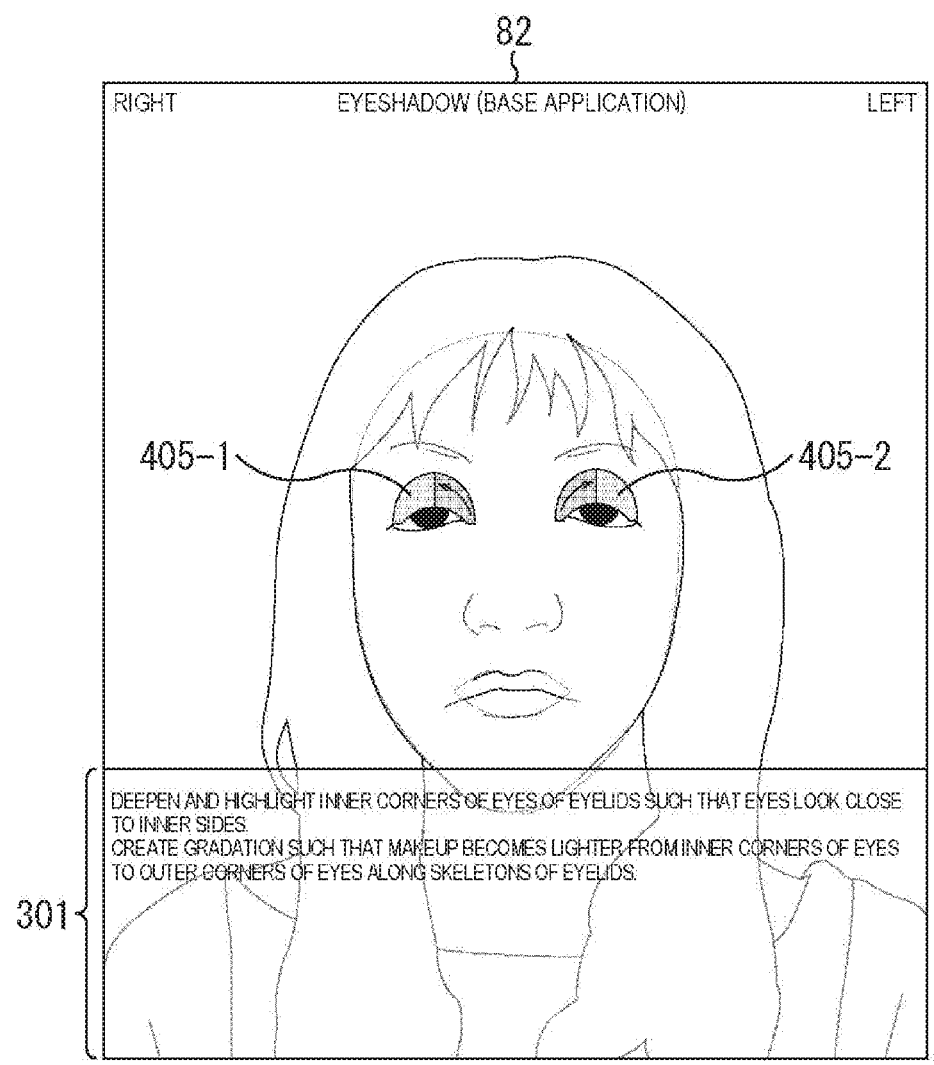
FIG. 34 is a diagram explaining a display example of recipe image display processing.

In step S56, the recipe image display control unit 95 displays the recipe image of the eyeshadow (base application) on the display unit 82 as illustrated, for example, in FIG. 34.

In the recipe image of the eyeshadow (base application) of FIG. 34, the arrows of the eyeshadow (base application) recipes 405-1 and 405-2 indicate specific directions of making gradation for makeup of the eyeshadow (base application).

Furthermore, the comment box 301 reads "Deepen and highlight the inner corners of the eyes of the eyelids such that the eyes look closer to the inner sides. Create gradation such that the makeup becomes lighter from the inner corners of the eyes to the outer corners of the eyes along the skeletons of the eyelids." The comment box 301 indicates point of makeup of the eyeshadow (base application) based on the balance evaluation result.

Figure 35:
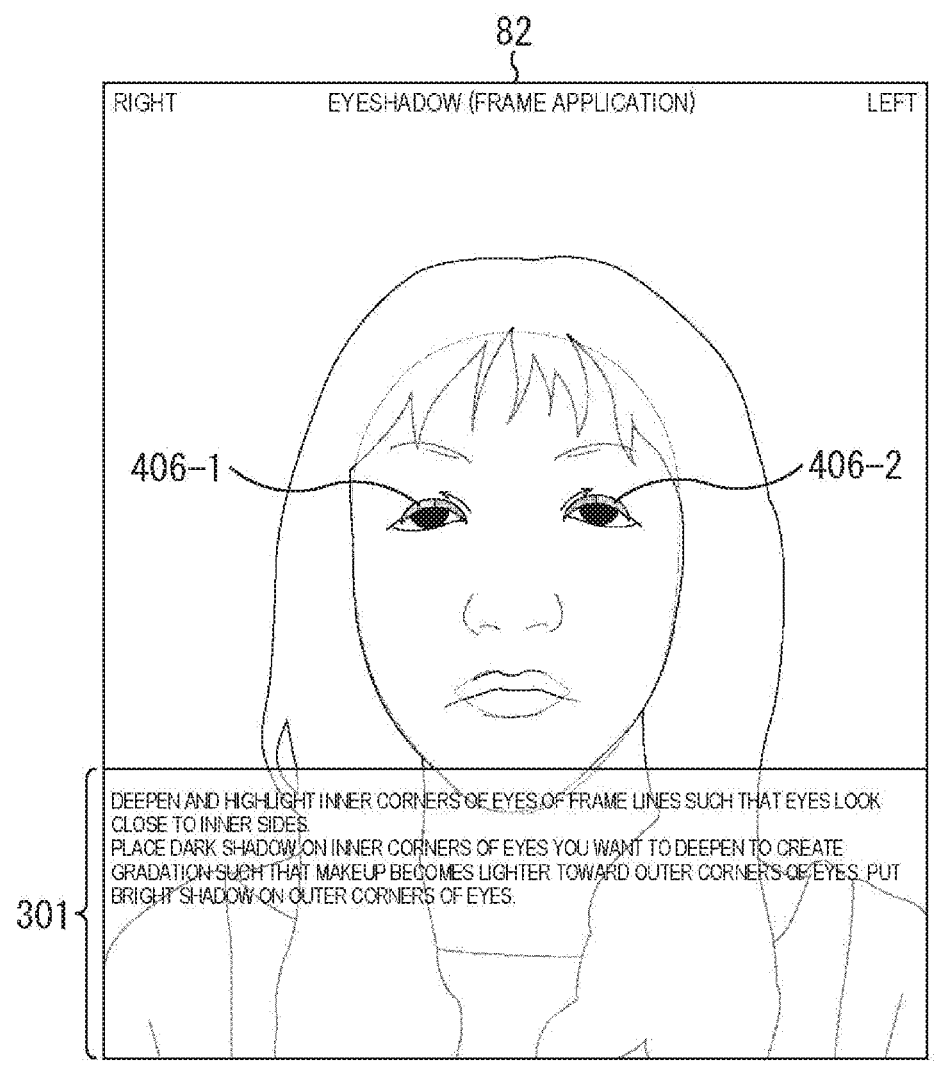
FIG. 35 is a diagram explaining a display example of recipe image display processing.

In step S57, the recipe image display control unit 95 displays the recipe image of the eyeshadow (frame application) on the display unit 82 as illustrated, for example, in FIG. 35.

In the recipe image of the eyeshadow (frame application) of FIG. 35, the arrows of the eyeshadow (frame application) recipes 406-1 and 406-2 indicate specific directions of making gradation for makeup of the eyeshadow (frame application).

Furthermore, the comment box 301 reads "Deepen and highlight the inner corners of the eyes of the frame lines such that the eyes look closer to the inner sides. Place dark shadow on the inner corners of the eyes you want to deepen to create gradation such that the makeup becomes lighter toward the outer corners of the eyes. Put bright shadow on the outer corners of the eyes." The comment box 301 indicates points of makeup of the eyeshadow (frame application) based on the balance evaluation result.

Figure 36:
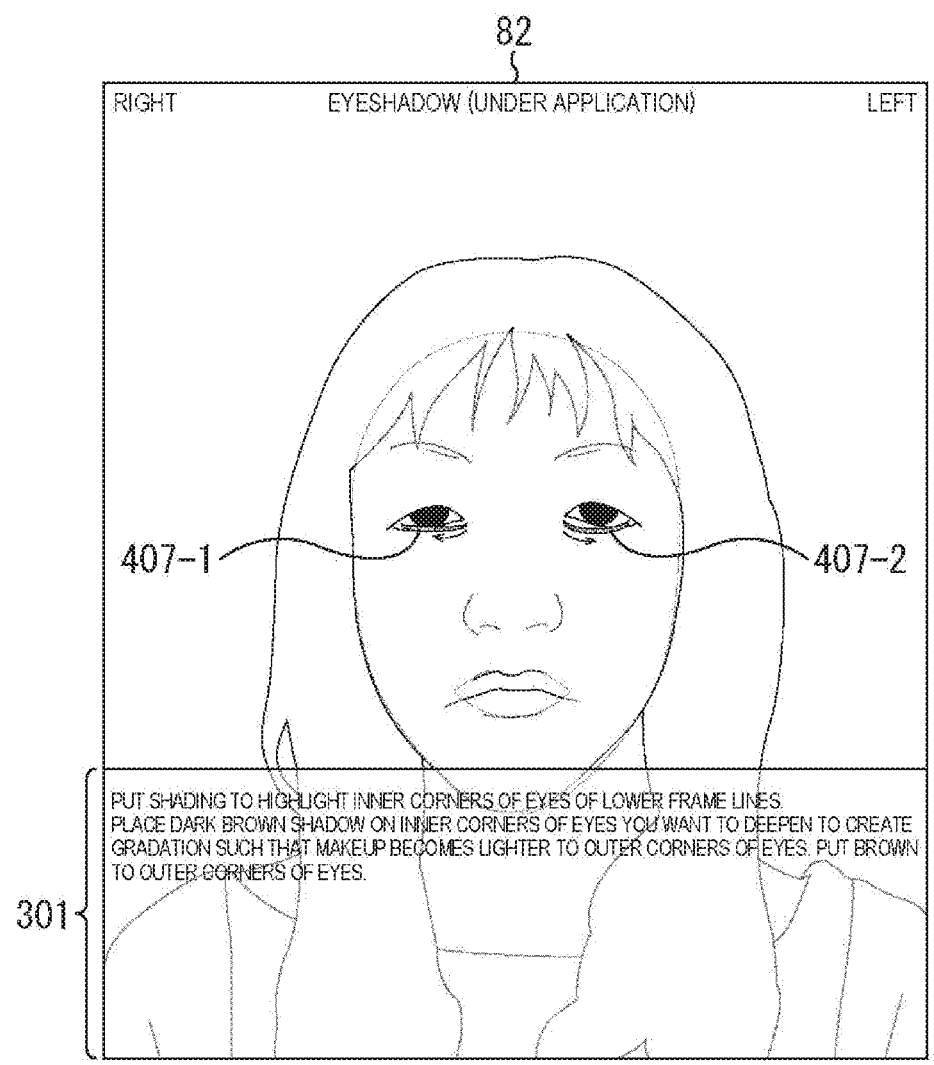
FIG. 36 is a diagram explaining a display example of recipe image display processing.

In step S58, the recipe image display control unit 95 displays the recipe image of the eyeshadow (under application) on the display unit 82 as illustrated, for example, in FIG. 36.

In the recipe image of the eyeshadow (under application) of FIG. 36, the arrows of the eyeshadow (under application) recipes 407-1 and 407-2 indicate directions of making gradation as recipes during makeup of the eyeshadow (under application).

Furthermore, the comment box 301 reads "Put shading to highlight the inner corners of the eyes of the lower frame lines. Place dark brown shadow on the inner corners of the eyes you want to deepen to create gradation such that the makeup becomes lighter to the outer corners of the eyes. Put brown to the outer corners of the eyes." The comment box 301 indicates point of makeup of the eyeshadow (under application) based on the balance evaluation result.

Figure 37:
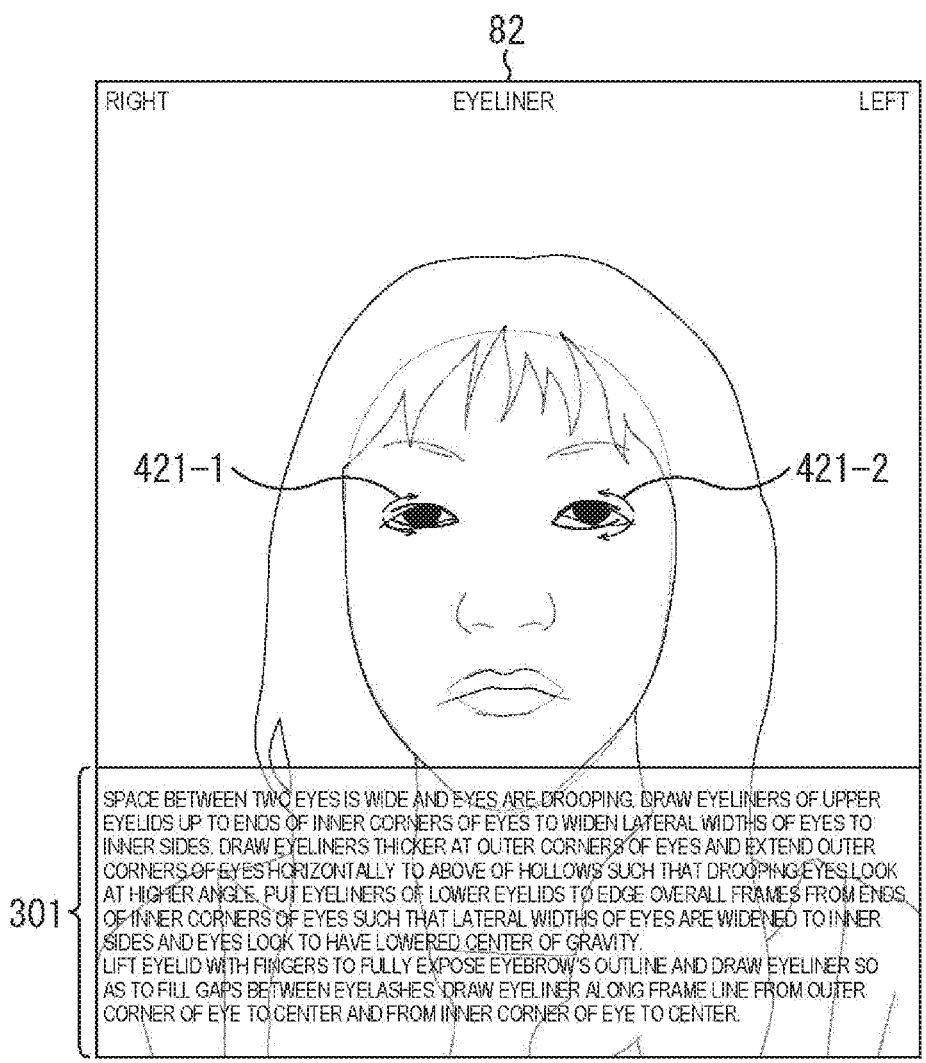
FIG. 37 is a diagram explaining a display example of recipe image display processing.

In step S59, the recipe image display control unit 95 displays the recipe image of eyeliners on the display unit 82 as illustrated, for example, in FIG. 37.

In the recipe image of the eyeliners of FIG. 37, the arrows of the eyeliner recipes 421-1 and 421-2 indicate specific directions of stretching eyeliners for makeup of the eyeliners.

Furthermore, the comment box 301 reads "The space between the inner corners of the eyes is wide and the eyes are drooping. Draw eye lines of the upper eyelids up to the ends of the inner corners of the eyes to widen the lateral widths of the eyes to the inner sides. Draw the eyeliners thicker at the outer corners of the eyes and extend the outer corners of the eyes horizontally to the above of the hollows such that the drooping eyes look at a higher angle. Put eyeliners of the lower eyelids to edge the overall frames from the ends of the inner corners of the eyes such that the widths of the eyes are widened to the inner sides and the eyes look to have a lowered center of gravity. Lift the eyelid with fingers to fully expose the eyebrow's outline and draw eyeliner so as to fill the gaps between the eyelashes. Draw the eyeliner along the frame line from the outer corner of the eye to the center and from the inner corner of the eye to the center." The comment box 301 indicates points of makeup of the eyeliners based on the balance evaluation result.

Figure 38:
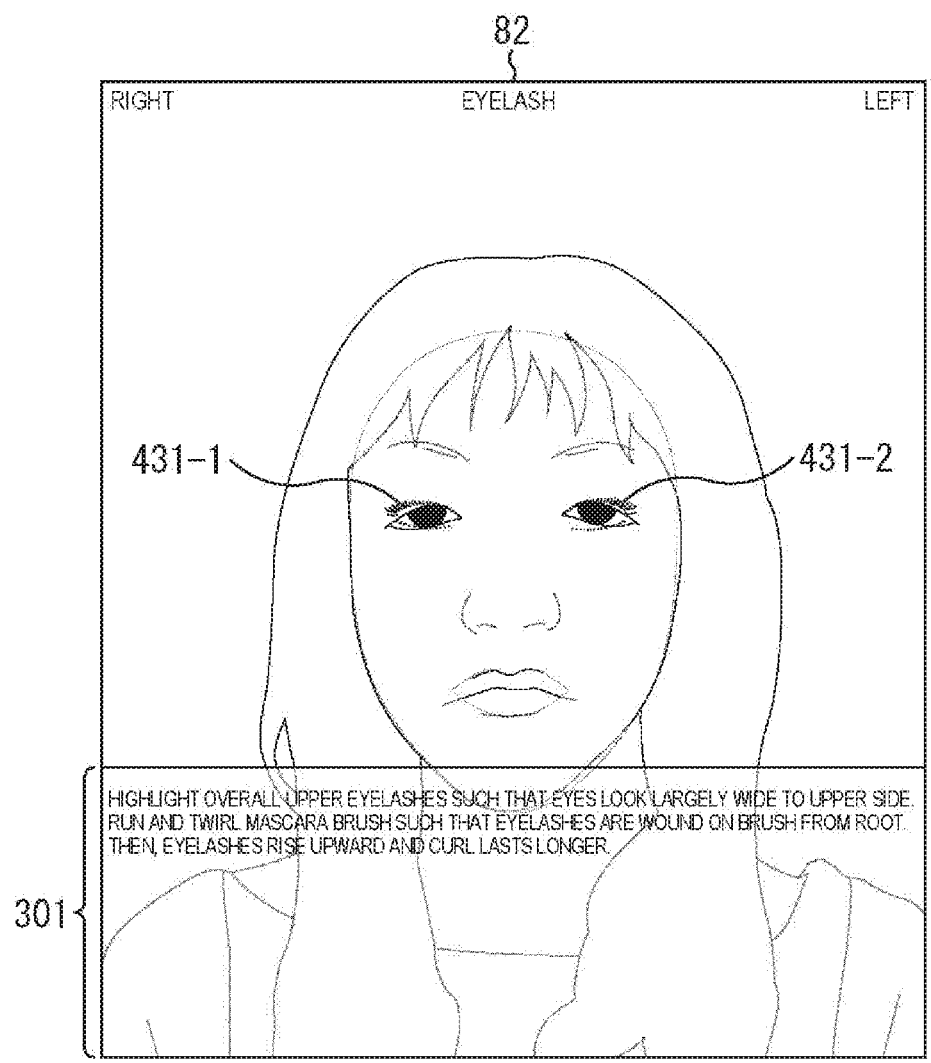
FIG. 38 is a diagram explaining a display example of recipe image display processing.

In step S60, the recipe image display control unit 95 displays the recipe image of the eyelash on the display unit 82 as illustrated, for example, in FIG. 38.

In the recipe image of the eyelash of FIG. 38, the eyelash recipes 431-1 and 431-2 indicate specific eyelash positions for makeup of the eyelash.

Furthermore, the comment box 301 reads "Highlight the overall upper eyelashes such that the eyes look largely wide to the upper side. Run and twirl a mascara brush such that the eyelashes are wound on the brush from the root. Then, the eyelashes rise upward and the curl lasts longer." The comment box 301 indicates points of the makeup of the eyelash based on the balance evaluation result.

Figure 39:
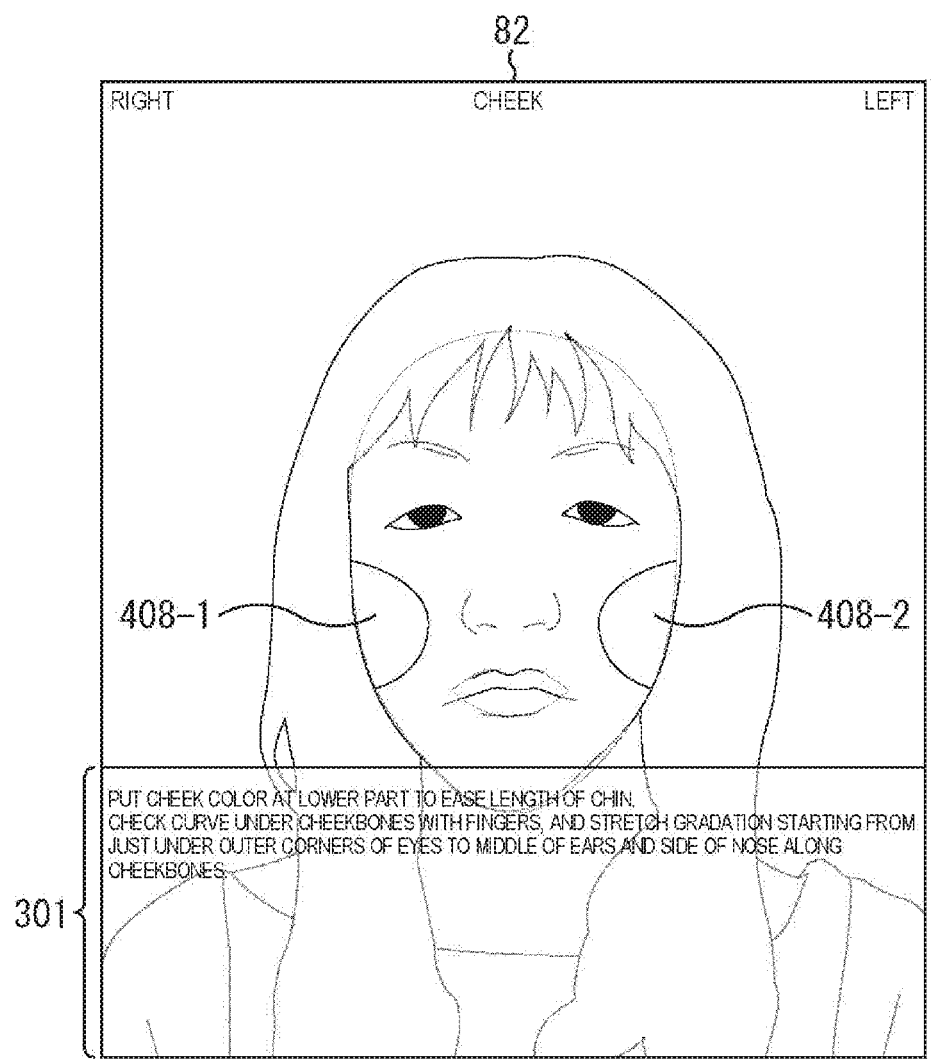
FIG. 39 is a diagram explaining a display example of recipe image display processing.

In step S61, the recipe image display control unit 95 displays the recipe image of the cheeks on the display unit 82 as illustrated, for example, in FIG. 39.

In the recipe image of the cheeks of FIG. 39, the cheek recipes 408-1 and 408-2 are colored as recipes during makeup of the cheeks.

Furthermore, the comment box 301 reads "Put cheek color at a lower part to ease the length of the chin. Check the curve under the cheekbones with fingers, and stretch gradation starting from just under the outer corners of the eyes to the middle of the ears and the side of the nose along the cheekbones." The comment box 301 indicates points of the makeup of the cheeks based on the balance evaluation result.

Figure 40:
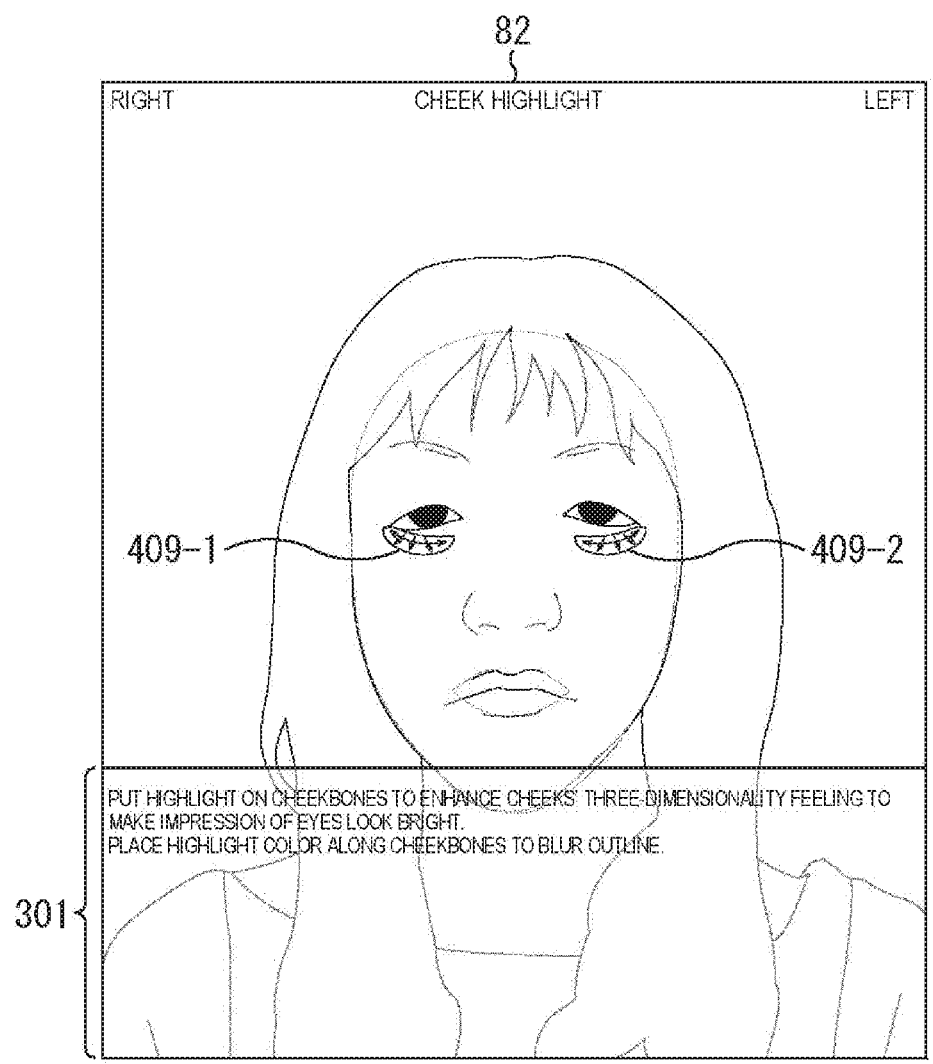
FIG. 40 is a diagram explaining a display example of recipe image display processing.

In step S62, the recipe image display control unit 95 displays the recipe image of the makeup of cheek highlight on the display unit 82 as illustrated, for example, in FIG. 40.

In the recipe image of the cheek highlight of FIG. 40, the cheek highlight recipes 409-1 and 409-2 are designated with arrows that indicate specific directions of the outlines of the highlight for the makeup of the cheek highlight.

Furthermore, the comment box 301 reads "Put highlight on the cheekbones to enhance the cheeks' three-dimensionality feeling to make the impression of the eyes look bright. Place highlight color along the cheekbones to blur the outline." The comment box 301 indicates points of the makeup of the cheek highlight based on the balance evaluation result.

Figure 41:
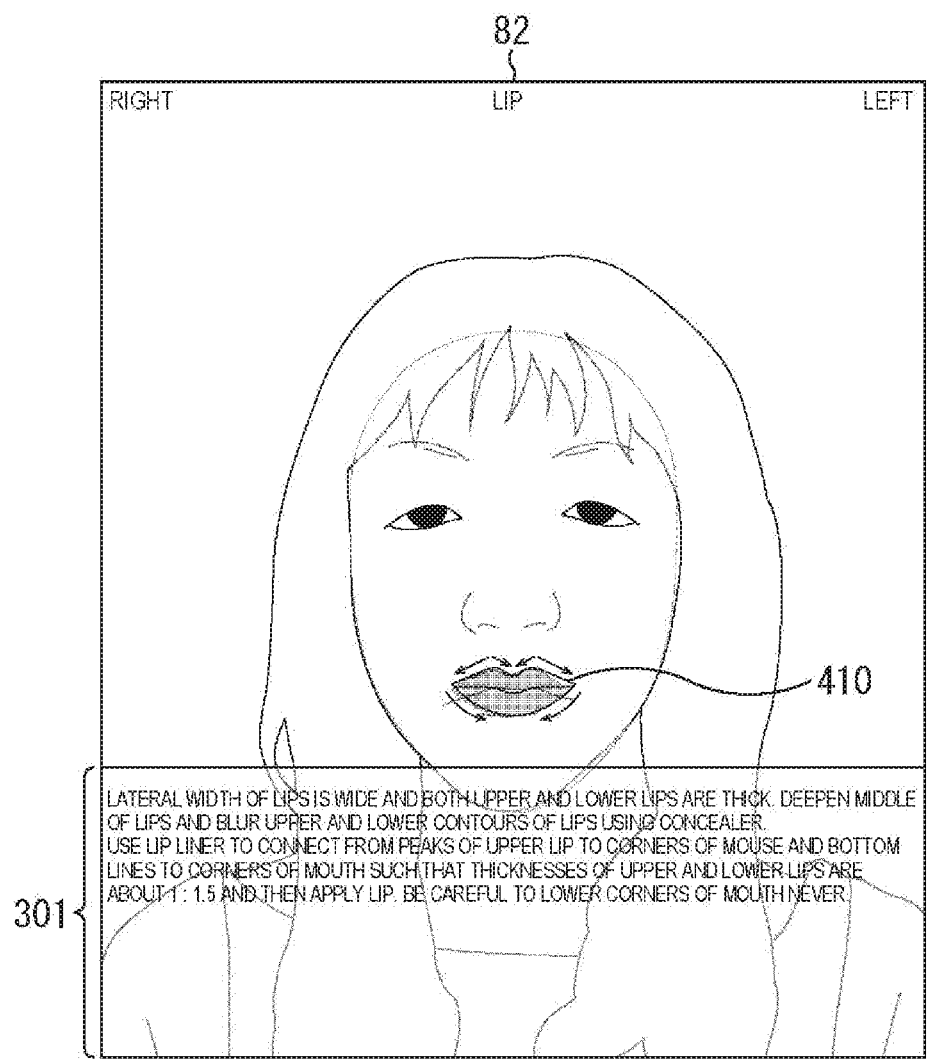
FIG. 41 is a diagram explaining a display example of recipe image display processing.

In step S63, the recipe image display control unit 95 displays the recipe image of the lip on the display unit 82 as illustrated, for example, in FIG. 41.

In the recipe image of the lip of FIG. 41, the lip recipe 410 is designated with the arrows that indicate specific directions of applying lip for the makeup of the lip.

Furthermore, the comment box 301 reads "The lateral width of the lips is wide and both the upper and lower lips are thick. Deepen the middle of the lips and blur the upper and lower contours of the lips using concealer. Use a lip liner to connect from the peaks of the upper lip to the corners of the mouse and the bottom lines to the corners of the mouth such that the thicknesses of the upper and lower lips are about 1:1.5 and then apply lip. Be careful to lower the corners of the mouth never." The comment box 301 indicates points of the makeup of the lip based on the balance evaluation result.

In the above processing, the methods of makeup with respect to each part of the user's face image are displayed in sequence in order to indicate the process at the timing when the operation unit 86, e.g., a button to be operated when the user proceeds to next processing, is operated. Therefore, when the user only proceeds the makeup that brings the face image closer to the best balance face image in order while viewing the recipe image of makeup displayed with respect to each part, it is possible to easily wear makeup that gives an impression in which the user's own face is closer to the best balance face image.

Note that the processing of displaying the recipes related to the makeup of each part is not limited to the aforementioned order, but may be displayed in a different order. Furthermore, the display may be returned to the previous recipe by the operation of the operation button, and the display may be returned to the display of the recipe of the previous part.

Here, the flowchart of FIG. 13 is described again.

In step S21, the database management unit 96 controls the communication unit 85 to read the new balance face information 152 and the recipe display information 153 stored in the terminal database 131 by the aforementioned series of processing and transmit them to the server apparatus 31 via the network 33 together with the user information 151.

At this time, the control unit 51 of the server apparatus 31 causes the communication unit 54 to receive the transmitted balance face information 152 and the transmitted recipe display information 153 together with the user information 151. Then, the control unit 51 controls the database management unit 61 to register the user balance face information 232 of the server database 111 of the storage unit 53 in association with the user information 241 registered in the user management information 231 as the recipe display update information 233.

By the above processing, when the user uses the tablet-like terminal apparatus 32 to only capture the user's own face image, it is possible to realize makeup closer to the best balance face image while viewing the recipe image for wearing makeup that brings the face image closer to the best balance face image. Furthermore, because makeup that also takes into account skin color can be realized, in a case where the skin color is deep due to sunburn or the like, a recipe that realizes makeup that makes the skin color white may be made. Even in a state where the face color is pale due to bad health conditions or the like, it is possible to realize makeup thereby such a state is not visually recognized.

Note that the best balance face image may be a face image in which the size and arrangement of each part constituting the face image are set on the basis of various theories and may, for example, be a face image that is specified under the conditions based on a theory of a prominent makeup artist or the like. Furthermore, the best balance face image may be a face image of a famous figure, e.g., an actor or a singer, the user likes. Furthermore, makeup recommended by a plurality of prominent makeup artists may be selected, and any of a plurality of best balance face images may be selected.

Furthermore, colors or the like to be used for makeup may be those fit to a destination to which the user visits, a season in which the user goes out, or the like. For example, colors or the like may be selected by setting variations including a change of color or depth according to a wedding ceremony, a funeral, a party, spring, summer, autumn, winter, or the like.

Moreover, a specific product to be used, its model number or the like may be introduced depending on a manufacturer of a cosmetic product used for makeup, and makeup preferentially using a new product may be set.

Furthermore, heretofore, an example in which a series of processing is realized by the terminal apparatus 32 alone has been described. However, after the user's face image is captured, the server apparatus 31 may execute the balance evaluation processing on the basis of the user's face image, generate a recipe image, and sequentially feed the recipe image to the terminal apparatus 32 and cause the terminal apparatus 32 to display the recipe image.

Moreover, in a case where the recipe display information 153 is once generated, any of the terminal apparatus 32 or the server apparatus 31 via the network 33 may specifies a user, reads corresponding recipe display information 153, and feeds the recipe display information 153 to the terminal apparatus 32 such that the processing of only displaying the recipe image is made.

Furthermore, heretofore, regarding the balance evaluation processing, which is the processing of step S17, an example of displaying the processing content has been described. However, the display unit 82 may display nothing as background processing.

Moreover, the recipe image for wearing makeup may be displayed by being switched with respect to each part in sequence at predetermined time intervals, or the recipe image may be displayed when the part is switched every time the operation unit 86 including an operation button or the like is operated. When the recipe image is displayed when the part is switched every time the operation unit 86 is operated, it is possible to perform display depending on the timing the user does makeup.

<Example of Execution by Software>

Incidentally, the aforementioned series of processing may be executed by hardware, but may be executed by software. In a case where the series of processing is executed by software, a program constituting the software is installed, from a recording medium, on a computer incorporated in dedicated hardware or, for example, a general-purpose personal computer or the like that can execute various functions when various programs are installed.

FIG. 42 is illustrates a configuration example of a general-purpose personal computer. This personal computer incorporates a central processing unit (CPU) 1001. An I/O interface 1005 is connected to the CPU 1001 via a bus 1004. A read only memory (ROM) 1002 and a random access memory (RAM) 1003 are connected to the bus 1004.

An input unit 1006 including an input device including a keyboard, a mouse, or the like with which the user inputs an operation command, an output unit 1007 that outputs a processing operation screen or an image of processing results to a display device, a storage unit 1008 including a hard disk drive or the like storing a program or various data, and a communication unit 1009 including a local area network (LAN) adapter or the like and executing communication processing via a network represented by the Internet are connected to the I/O interface 1005. Furthermore, a drive 1010 that reads and writes data with respect to a removable medium 1011, e.g., a magnetic disk (including a flexible disk), an optical disk (including a compact disc-read only memory (CD-ROM), a digital versatile disc (DVD)), a magneto-optical disk (including mini disc (MD)), or a semiconductor memory is connected.

The CPU 1001 executes a program stored in the ROM 1002 or various processing following a program that is read from the removable medium 1011, e.g., a magnetic disk, an optical disk, a magneto-optical disk, or a semiconductor memory, installed on the storage unit 1008, and loaded on the RAM 1003 from the storage unit 1008. The RAM 1003 also appropriately stores data or the like that is required for execution of various processing by the CPU 1001.

In a computer configured in the aforementioned manner, for example, the aforementioned series of processing is carried out such that the CPU 1001 loads a program stored in the storage unit 1008 on the RAM 1003 via the I/O interface 1005 and the bus 1004 and executes the program.

The program executed by the computer (CPU 1001) may, for example, be provided by being recorded on the removable medium 1011, which is, e.g., a package medium. Furthermore, the program may be provided via a wired or wireless transmission medium, e.g., a local area network, the Internet, or a digital satellite broadcast.

In a computer, the program can be installed on the storage unit 1008 via the I/O interface 1005 such that the removable medium 1011 is mounted on the drive 1010. Furthermore, the program can be received by the communication unit 1009 and installed on the storage unit 1008 via a wired or wireless transmission medium. In addition, the program can be pre-installed on the ROM 1002 or the storage unit 1008.

Note that the program executed by the computer may be a program that is processed in chronological order along the order described in the present description or may be a program that is processed in parallel or at a required timing, e.g., when call is carried out.

Note that the CPU 1001 of FIG. 42 corresponds to the control unit 83, the input unit 1006 and the output unit 1007 correspond respectively to the imaging unit 81 and the operation unit 86, and the communication unit 1009 corresponds to the communication unit 85.

Furthermore, in the present description, the system means a cluster of a plurality of constituent elements (a device, a module (component) or the like), and it does not matter whether or not all the constituent elements are present in the same enclosure. Thus, a plurality of devices that is accommodated in separate enclosures and connected via a network and a single device with a plurality of modules accommodated in a single enclosure are both the system.

Note that an embodiment of the present disclosure is not limited to the aforementioned embodiment, but various changes may be made within a scope without departing from the gist of the present disclosure.

For example, the present disclosure may be a configuration of cloud computing in which a single function is shared and jointly processed by a plurality of devices via a network.

Furthermore, the steps described in the aforementioned flowcharts can be executed by a single device or can be divided and executed by a plurality of devices.

Moreover, in a case where a single step includes a plurality of processing, the plurality of processing included in the single step can be executed by a single device or can be divided and executed by a plurality of devices.

Note that the present disclosure may adopt the configuration described below.

<1> An information processing apparatus including:

an imaging unit configured to capture a face image of a user; and a makeup setting unit configured to set makeup to be worn on a face of the user such that the face image of the user looks closer to an optimum face image in which parts constituting the face image of the user have optimum sizes and are arranged in optimum positions.

<2> The information processing apparatus according to <1>, in which the optimum face image is a face image in which each of the parts constituting the face image of the user has a predetermined size and is arranged in a predetermined position.

<3> The information processing apparatus according to <2>, in which the optimum face image is a face image in which the parts of face images of a plurality of persons have an average size and are arranged in an average position.

<4> The information processing apparatus according to <2>, in which the optimum face image is a face image in which the parts have sizes and are arranged in positions, which are set on the basis of a predetermined theory.

<5> The information processing apparatus according to <2>, in which the optimum face image is a face image in which the parts have sizes and are arranged in positions, which are set on the basis of a face image of a predetermined person.

<6> The information processing apparatus according to any of <1> to <5>, further including:

a feature amount detection unit configured to detect a feature point for recognizing the parts of the face image of the user; and an evaluation unit configured to perform evaluation by recognizing the parts and scoring a difference of each of the parts of the face image of the user with respect to the optimum face image on the basis of the feature amount, in which the makeup setting unit sets makeup to be worn on the face of the user on the basis of evaluation results of the evaluation unit such that the face image of the user looks closer to the optimum face image in which the parts constituting the face image of the user have optimum sizes and are arranged in optimum positions.

<7> The information processing apparatus according to <6>, in which the makeup setting unit generates a face image in which makeup is worn in a variously changing manner on the face image of the user, and the evaluation unit sets makeup in which the score of evaluation results obtained when a difference of each of the parts between the face image on which makeup is worn in a variously changing manner and the optimum face image is scored is minimum, as makeup to be worn on the face of the user.

<8> The information processing apparatus according to <7>, further including an analysis unit configured to analyze a skin color of the face image of the user, in which the makeup setting unit sets makeup to be worn on the face of the user on the basis of results of color analysis analyzed by the analysis unit and the evaluation results such that the face image of the user looks closer to the optimum face image in which the parts constituting the face image of the user have optimum sizes and are arranged in optimum positions.

<9> The information processing apparatus according to any of <1> to <8>, further including a recipe image generation unit configured to generate an image displaying a process of the set makeup as a recipe image of each part.

<10> The information processing apparatus according to <9>, in which the recipe image generation unit displays the recipe image set by the makeup setting unit in sequence with respect to each of the parts.

<11> The information processing apparatus according to <9>, further including a registration unit configured to register the face image of the user and the recipe image corresponding to makeup set on the basis of the face image of the user in a database in association with information for identifying the user.

<12> The information processing apparatus according to <9>, further including a communication unit configured to transmit the face image of the user and the recipe image corresponding to makeup set on the basis of the face image of the user to an external server apparatus in association with information for identifying the user for registration as a database.

<13> An information processing method including steps of:

acquiring a face image of a user; and setting makeup to be worn on a face of the user such that the face image of the user looks closer to an optimum face image in which parts constituting the face image of the user have optimum sizes and are arranged in optimum positions.

<14> A program causing a computer to function as:

an imaging unit configured to capture a face image of a user; and a makeup setting unit configured to set makeup to be worn on a face of the user such that the face image of the user looks closer to an optimum face image in which parts constituting the face image of the user have optimum sizes and are arranged in optimum positions.

REFERENCE SIGNS LIST

11 Information processing system
31 Server apparatus
32, 32-1 to 32-*n* Terminal apparatus
33 Network 51 Control apparatus
52 Communication unit
53 Storage unit
61 Database management unit
81 Imaging unit
82 Display unit
83 Control unit
84 Storage unit
85 Communication unit
86 Operation unit
91 Feature point extraction unit
92 Balance evaluation analysis unit
93 Makeup setting unit
94 Color analysis unit
95 Recipe image display control unit
96 Database management unit
111 Server database
131 Terminal database

The invention claimed is:

1. An information processing apparatus, comprising:
an imaging unit configured to capture a first face image of a user;
a makeup setting unit configured to set makeup on the first face image of the user such that the first face image of the user looks closer to an optimum face image, wherein
the optimum face image includes a plurality of parts that constitutes the first face image of the user,
each part of the plurality of parts in the optimum face image has a specific size, and
each part of the plurality of parts in the optimum face image is in a specific position;
a recipe image generation unit configured to:
generate a plurality of recipe images based on the set makeup,
wherein each recipe image of the plurality of recipe images indicates a process of the set makeup for a respective part of the plurality of parts of the first face image; and
sequentially display the plurality of recipe images with respect to each part of the plurality of parts of the first face image.

2. The information processing apparatus according to claim 1, wherein
each part of the plurality of parts in the optimum face image has an average size, and
each part of the plurality of parts in the optimum face image has an average position,
the average size corresponds to an average of sizes of a plurality of parts of a plurality of face images of a plurality of persons,
the first face image is different from the plurality of face images, and
the average position corresponds to an average of positions of the plurality of parts of the plurality of face images of the plurality of persons.

3. The information processing apparatus according to claim 1, wherein the specific size and the specific position of each part of the plurality of parts in the optimum face image is based on a theory.

4. The information processing apparatus according to claim 1, wherein the specific size and the specific position of each part of the plurality of parts in the optimum face image is based on a second face image of a specific person.

5. The information processing apparatus according to claim 1, further comprising:
a feature amount detection unit configured to detect a feature point of the first face image of the user; and
an evaluation unit configured to evaluate a score for a difference of each part of the plurality of parts of the first face image with respect to the optimum face image, wherein
the score is evaluated based on the detected feature point, and
the makeup setting unit is further configured to set the makeup on the first face image of the user based on the evaluated score.

6. The information processing apparatus according to claim 5, wherein
the makeup setting unit is further configured to:
set the makeup in a variously changing manner on the first face image of the user; and
generate a second face image based on the makeup that is set in the variously changing manner, the second face image includes the plurality of parts that constitutes the first face image, and
the evaluation unit is further configured to set the makeup that has a minimum score for a difference of each part of the plurality of parts in the second face image with respect to the optimum face image.

7. The information processing apparatus according to claim 6, further comprising an analysis unit configured to analyze a skin color of the first face image of the user,
wherein the makeup setting unit is further configured to set the makeup on the first face image of the user based on the analysis of the skin color.

8. The information processing apparatus according to claim 1, further comprising a registration unit configured to register, in a database, the first face image of the user and the plurality of recipe images in association with information for identification of the user.

9. The information processing apparatus according to claim 1, further comprising a communication unit configured to transmit, to an external server apparatus, the first face image of the user and the plurality of recipe images in association with information for identification of the user,
wherein the first face image and the plurality of recipe images is transmitted in association with the information to the external server apparatus for registration in a database of the external server apparatus.

10. An information processing method, comprising:
acquiring a face image of a user;
setting makeup on the acquired face image of the user such that the acquired face image of the user looks closer to an optimum face image, wherein
the optimum face image includes a plurality of parts that constitutes the acquired face image of the user,
each part of the plurality of parts in the optimum face image has a specific size, and
each part of the plurality of parts in the optimum face image is in a specific position;
generating a plurality of recipe images based on the set makeup,
wherein each recipe image of the plurality of recipe images indicates a process of the set makeup for a respective part of the plurality of parts of the acquired face image; and
sequentially displaying the plurality of recipe images with respect to each part of the plurality of parts of the acquired face image.

11. A non-transitory computer-readable medium having stored thereon, computer-executable instructions, which when executed by a computer, cause the computer to execute operations, the operations comprising:
  acquiring a face image of a user;
  setting makeup on the acquired face image of the user such that the acquired face image of the user looks closer to an optimum face image, wherein
    the optimum face image includes a plurality of parts that constitutes the acquired face image of the user,
    each part of the plurality of parts in the optimum face image has a specific size, and
    each part of the plurality of parts in the optimum face image is in a specific position;
  generating a plurality of recipe images based on the set makeup,
    wherein each recipe image of the plurality of recipe images indicates a process of the set makeup for a respective part of the plurality of parts of the acquired face image; and
  sequentially displaying the plurality of recipe images with respect to each part of the plurality of parts of the acquired face image.

* * * * *